United States Patent
Tsujiuchi et al.

(10) Patent No.: US 9,623,366 B2
(45) Date of Patent: Apr. 18, 2017

(54) $CO_2$ RECOVERY SYSTEM AND $CO_2$ RECOVERY METHOD

(71) Applicant: MITSUBISHI HEAVY INDUSTRIES, LTD., Tokyo (JP)

(72) Inventors: Tatsuya Tsujiuchi, Austin, TX (US); Takahito Yonekawa, Austin, TX (US); Shintaro Honjo, Austin, TX (US); Masayuki Inui, Austin, TX (US); Koji Nakayama, Hiroshima (JP); Takashi Kamijo, Tokyo (JP); Hiromitsu Nagayasu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 660 days.

(21) Appl. No.: 13/784,173

(22) Filed: Mar. 4, 2013

(65) Prior Publication Data
US 2014/0248206 A1 Sep. 4, 2014

(51) Int. Cl.
*B01D 53/96* (2006.01)
*B01D 53/14* (2006.01)
(Continued)

(52) U.S. Cl.
CPC ..... *B01D 53/1475* (2013.01); *B01D 53/1425* (2013.01); *B01D 2252/20484* (2013.01);
(Continued)

(58) Field of Classification Search
CPC B01D 53/1425; B01D 53/1475; B01D 53/96; B01D 53/965
(Continued)

(56) References Cited

U.S. PATENT DOCUMENTS 6,110,256 A * 8/2000 Reynolds et al. ...... B03C 3/019
96/53
6,270,739 B1 * 8/2001 Barnicki et al. ..... C07D 301/32
423/228
(Continued)

FOREIGN PATENT DOCUMENTS

JP 69-169920 A 9/1984
JP 04-243520 A 8/1992
(Continued)

OTHER PUBLICATIONS

Written Opinion of International Application No. PCT/JP2014/054314, mailing date of Jun. 3, 2014, w/English translation (10 pages).
(Continued)

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

A $CO_2$ recovery system includes an absorption apparatus that brings a $CO_2$ absorption liquid into contact with an exhaust gas treated by a pre-treatment apparatus so that $CO_2$ in the exhaust gas is absorbed into the $CO_2$ absorption liquid; a regeneration apparatus that separates $CO_2$ from the $CO_2$ absorption liquid; an absorption liquid circulation path that circulates the $CO_2$ absorption liquid between the absorption apparatus and the regeneration apparatus; and an impurity removal unit that removes impurities having a high concentration in the absorption liquid circulation path, in the absorption liquid circulation path and/or in the pre-treatment apparatus in advance.

9 Claims, 15 Drawing Sheets

(51) Int. Cl.
    *C02F 1/20*     (2006.01)
    *C02F 1/42*     (2006.01)
    *C02F 1/52*     (2006.01)
    *C02F 101/10*   (2006.01)
    *C02F 103/08*   (2006.01)

(52) U.S. Cl.
    CPC .............. *B01D 2252/20489* (2013.01); *B01D 2257/504* (2013.01); *B01D 2258/0283* (2013.01); *C02F 1/20* (2013.01); *C02F 1/42* (2013.01); *C02F 1/5236* (2013.01); *C02F 2101/106* (2013.01); *C02F 2103/08* (2013.01); *Y02C 10/04* (2013.01); *Y02C 10/06* (2013.01)

(58) Field of Classification Search
    USPC .................................................. 422/168, 169
    See application file for complete search history.

(56) References Cited

U.S. PATENT DOCUMENTS

| | | | | |
|---|---|---|---|---|
| 6,312,503 | B1* | 11/2001 | Fike et al. ............. | B01D 47/12 47/12 |
| 7,833,422 | B2* | 11/2010 | Akiho ....................... | C02F 1/68 210/757 |
| 7,938,889 | B2* | 5/2011 | Iijima ................ | B01D 53/1425 95/183 |
| 2005/0169825 | A1 | 8/2005 | Cadours et al. | |
| 2007/0148068 | A1* | 6/2007 | Burgers et al. .... | B01D 53/1425 423/220 |
| 2008/0072762 | A1 | 3/2008 | Gal | |
| 2011/0092355 | A1* | 4/2011 | Iijima et al. ........ | B01D 53/1425 502/55 |
| 2011/0150733 | A1 | 6/2011 | Dube et al. | |
| 2012/0235087 | A1* | 9/2012 | Handagama et al. .................. | B01D 53/1425 422/187 |

FOREIGN PATENT DOCUMENTS

| | | |
|---|---|---|
| JP | 05-245339 A | 9/1993 |
| JP | 07-241440 A | 9/1995 |
| JP | 2001-025628 A | 1/2001 |
| JP | 2001-129559 A | 5/2001 |
| JP | 2002-239410 A | 8/2002 |
| JP | 2007-508936 A | 4/2007 |
| JP | 2008-238113 A | 10/2008 |
| JP | 2009-521314 A | 6/2009 |
| JP | 2009-179546 A | 8/2009 |
| JP | 2010-540214 A | 12/2010 |
| JP | 2011-36730 A | 2/2011 |
| JP | 2011-56399 A | 3/2011 |
| JP | 2011-104580 A | 6/2011 |
| JP | 2011-177685 A | 9/2011 |
| JP | 2011-194286 A | 10/2011 |
| JP | 2011-235247 A | 11/2011 |
| JP | 2012-030168 A | 2/2012 |
| JP | 2012-086216 A | 5/2012 |
| JP | 2012-091083 A | 5/2012 |
| JP | 2012-152704 A | 8/2012 |
| JP | 2012-236166 A | 12/2012 |
| JP | 2012-236170 A | 12/2012 |
| JP | 2014-512944 A | 5/2014 |
| WO | 2009/104744 A1 | 8/2009 |

OTHER PUBLICATIONS

International Search Report of International Application No. PCT/JP2014/054314, mailing date of Jun. 3, 2014, w/ English translation (8 pages).
Partial International Search Report dated Mar. 25, 2014, issued in International Application No. PCT/JP2014/054314 with English Translation (6 pages).
Office Action dated May 31, 2016, issued in counterpart Japanese Patent Application No. 2015-504244, with English Translation. (10 pages).
Search Report dated Sep. 21, 2016, issued in counterpart European Application No. 14760426.8 (8 pages).
Office Action dated Nov. 1, 2016 issued in counterpart Japanese Patent Application No. 2015-504244, (8 pages), w/English translation.

* cited by examiner

CO₂ RECOVERY SYSTEM AND CO₂ RECOVERY METHOD

TECHNICAL FIELD

The present invention relates to a $CO_2$ recovery system and a $CO_2$ recovery method for recovering and removing $CO_2$ from an exhaust gas.

BACKGROUND ART

Conventionally, in a thermal power plant or the like, for example, fossil fuel such as coal, oil, or LNG is burned in a boiler to generate steam, and power generation is performed by turning a turbine using this steam. Further, in such a thermal power plant or the like, since a large amount of exhaust gas containing $CO_2$, which is one of the greenhouse gases contributing global warming, is exhausted with combustion of the fossil fuel, a facility for treating this exhaust gas, particularly, recovering and removing $CO_2$ from the exhaust gas, is provided.

Further, a system that recovers $CO_2$ (a $CO_2$ recovery apparatus) includes, for example, a quencher (a pre-treatment apparatus) 2 that performs pre-treatment of an exhaust gas 1, an absorber (an absorption apparatus) 4 that brings the exhaust gas treated by the quencher 2 and having a low temperature into contact with a $CO_2$ absorption liquid (lean solvent 3) to absorb and remove $CO_2$ from the exhaust gas 1, and a regenerator (a regeneration apparatus) 6 that separates and recovers $CO_2$ from the $CO_2$ absorption liquid (rich solvent 5) having absorbed $CO_2$ in the absorber 4, as shown in FIG. 15 (e.g., see Patent Document 1 and Patent Document 2).

Further, the $CO_2$ absorption liquid 3 after $CO_2$ has been recovered in the regenerator 6 is sent to the absorber 4 and used to absorb and remove $CO_2$ from the exhaust gas 1 again. In other words, this $CO_2$ recovery system is configured to circulate the $CO_2$ absorption liquids 3 and 5 in an absorption liquid circulation path 7 between the absorber 4 and the regenerator 6 and repeat the absorption of $CO_2$ into the $CO_2$ absorption liquid 3 and the recovery of $CO_2$ from the $CO_2$ absorption liquid 5 to recover and remove $CO_2$ from the exhaust gas 1, which is sequentially supplied.

PRIOR ART DOCUMENT

Patent Document

[Patent Document 1] Japanese Unexamined Patent Application, First Publication No. 2011-036730
[Patent Document 2] Japanese Unexamined Patent Application, First Publication No. 2012-091083

SUMMARY OF INVENTION

Problems to be Solved by the Invention

Here, heavy metals such as mercury, chromium, or cadmium, or harmful substances (impurities) such as selenium or arsenic are contained in a gaseous form (gas) or a fine particle form (solid) according to the quality of coal or the like in an exhaust gas generated with combustion of the coal or the like. Further, when an exhaust gas containing this kind of heavy metal or the like is treated in a $CO_2$ recovery system, many harmful substances in the exhaust gas are removed in the quencher or the like, but particularly, some solid harmful substances may not be removed in the quencher or the like, may be sent to the absorber together with the exhaust gas, and may be dissolved in the $CO_2$ absorption liquid.

Further, in the $CO_2$ recovery system of the related art described above, a problem arises in that the harmful substances in the $CO_2$ absorption liquid have a gradually higher concentration since the $CO_2$ absorption liquid is circulated and used between the absorber and the regenerator. Particularly, it was confirmed that selenium has a high concentration in the $CO_2$ absorption liquid. There is a great need for a scheme for removing harmful substances (impurities) including selenium from the $CO_2$ absorption liquid.

Means for Solving the Problems

According to a first aspect of the present invention, a $CO_2$ recovery system includes: a pre-treatment apparatus that cools an exhaust gas; an absorption apparatus that brings a $CO_2$ absorption liquid into contact with the exhaust gas treated by the pre-treatment apparatus so that $CO_2$ in the exhaust gas is absorbed into the $CO_2$ absorption liquid; a regeneration apparatus that receives the $CO_2$ absorption liquid having absorbed $CO_2$ from the absorption apparatus and heats the $CO_2$ absorption liquid to separate $CO_2$ from the $CO_2$ absorption liquid; an absorption liquid circulation path that circulates the $CO_2$ absorption liquid between the absorption apparatus and the regeneration apparatus; and an impurity removal unit that removes impurities dissolved in the $CO_2$ absorption liquid from the exhaust gas and having a high concentration in the absorption liquid circulation path, in the absorption liquid circulation path and/or in the pre-treatment apparatus in advance.

In the $CO_2$ recovery system, the impurities may be substances containing at least one kind of selenium, arsenic, cadmium, lead, hexavalent chromium, mercury, copper, fluorine, and boron.

In the $CO_2$ recovery system, the impurity removal unit may include an electrostatic precipitator provided in the pre-treatment apparatus.

In the $CO_2$ recovery system, the impurity removal unit may include an impurity removal demister provided in the pre-treatment apparatus and/or the absorption apparatus.

In the $CO_2$ recovery system, the pre-treatment apparatus may include a scrubber, and the impurity removal unit may include an exhaust water treatment apparatus that treats washing water sprayed from the scrubber of the pre-treatment apparatus to remove impurities contained in the washing water.

In the $CO_2$ recovery system, the impurity removal unit may include a filtering apparatus that filters the $CO_2$ absorption liquid supplied from the absorption apparatus to the regeneration apparatus of the absorption liquid circulation path and/or the $CO_2$ absorption liquid supplied from the regeneration apparatus to the absorption apparatus of the absorption liquid circulation path to remove the impurities.

In the $CO_2$ recovery system, the absorption apparatus may include a scrubber, and the impurity removal unit may include a filtering apparatus that filters the washing water sprayed by the scrubber of the absorption apparatus to remove impurities contained in the washing water, and returns the filtered washing water to a washing water circulation path and/or the absorption liquid circulation path of the scrubber of the absorption apparatus.

In the $CO_2$ recovery system, the impurity removal unit may include an ion-exchange apparatus that brings the $CO_2$ absorption liquid supplied from the absorption apparatus to the regeneration apparatus of the absorption liquid circulation path and/or the $CO_2$ absorption liquid supplied from the regeneration apparatus to the absorption apparatus of the absorption liquid circulation path into contact with an ion-exchange resin to remove the impurities.

In the $CO_2$ recovery system, the impurity removal unit may include a reclaimer that draws and heats the $CO_2$ absorption liquid of the absorption liquid circulation path, heats and concentrates impurities in the $CO_2$ absorption liquid, and returns condensate water to the regeneration apparatus; and an ion-exchange apparatus that brings the $CO_2$ absorption liquid of an absorption liquid drawing path that supplies the $CO_2$ absorption liquid from the absorption liquid circulation path to the reclaimer into contact with an ion-exchange resin to remove the impurities.

In the $CO_2$ recovery system, the impurity removal unit may include a reclaimer that draws and heats the $CO_2$ absorption liquid of the absorption liquid circulation path, heats and concentrates impurities in the $CO_2$ absorption liquid, and returns condensate water to the regeneration apparatus; and a coagulation sedimentation treatment apparatus that coagulates and sediments the $CO_2$ absorption liquid of an absorption liquid drawing path that supplies the $CO_2$ absorption liquid from the absorption liquid circulation path to the reclaimer, to remove the impurities.

In the $CO_2$ recovery system, the coagulation sedimentation treatment apparatus may adjust pH of the $CO_2$ absorption liquid using $CO_2$ separated in the regeneration apparatus.

In the $CO_2$ recovery system, the impurity removal unit may include a reclaimer that draws and heats the $CO_2$ absorption liquid of the absorption liquid circulation path, heats and concentrates impurities in the $CO_2$ absorption liquid, and returns condensate water to the regeneration apparatus; and an incinerator that incinerates concentrated residue generated from the reclaimer, wherein steam may be generated using exhaust heat when the concentrated residue is incinerated in the incinerator, and the steam may be used in the reclaimer and/or the regeneration apparatus.

In the $CO_2$ recovery system, the impurity removal unit may include a reclaimer that draws and heats the $CO_2$ absorption liquid of the absorption liquid circulation path, heats and concentrates impurities in the $CO_2$ absorption liquid, and returns condensate water to the regeneration apparatus; and an ion-exchange apparatus that brings concentrated residue generated from the reclaimer into contact with an ion-exchange resin to remove the impurities.

In the $CO_2$ recovery system, the impurity removal unit may include a reclaimer that draws and heats the $CO_2$ absorption liquid of the absorption liquid circulation path, heats and concentrates impurities in the $CO_2$ absorption liquid, and returns condensate water to the regeneration apparatus, and a coagulation sedimentation treatment apparatus that coagulates and sediments concentrated residue generated from the reclaimer to remove the impurities.

In the $CO_2$ recovery system, the impurity removal unit may include a reclaimer that draws and heats the $CO_2$ absorption liquid of the absorption liquid circulation path, heats and concentrates impurities in the $CO_2$ absorption liquid, and returns condensate water to the regeneration apparatus; and an electrodialysis treatment apparatus that performs electrodialysis on concentrated residue generated from the reclaimer to remove the impurities.

In the $CO_2$ recovery system, the pre-treatment apparatus may include a scrubber, and acidic treated water generated by treatment in the electrodialysis treatment apparatus of the impurity removal unit may be supplied as cleaning water for acid cleaning of the scrubber of the pre-treatment apparatus.

In the $CO_2$ recovery system, the impurity removal unit may include a first reclaimer that draws and heats the $CO_2$ absorption liquid of the absorption liquid circulation path, heats and concentrates impurities in the $CO_2$ absorption liquid, and returns condensate water to the regeneration apparatus; and a second reclaimer that heats concentrated residue generated from the first reclaimer, further heats and concentrates the concentrated residue, and returns condensate water to the regeneration apparatus.

In the $CO_2$ recovery system, NaOH may be added to the concentrated residue at the time of treatment in the second reclaimer of the impurity removal unit.

In the $CO_2$ recovery system, the impurity removal unit may include a vacuum reclaiming path disposed by connecting a condenser, a gas and liquid separation apparatus, and a vacuum fan in series with the second reclaimer.

In the $CO_2$ recovery system, the impurity removal unit may include a first reclaimer that draws and heats the $CO_2$ absorption liquid of the absorption liquid circulation path, heats and concentrates impurities in the $CO_2$ absorption liquid, and returns condensate water to the regeneration apparatus; a condensate water return path that returns condensate water separated in the first reclaimer to the regeneration apparatus; and a vacuum reclaiming path disposed by connecting a condenser, a gas and liquid separation apparatus, and a vacuum fan in series with the first reclaimer.

In the $CO_2$ recovery system, the impurity removal unit may include a first reclaimer that draws and heats the $CO_2$ absorption liquid of the absorption liquid circulation path, heats and concentrates impurities in the $CO_2$ absorption liquid, and returns condensate water to the regeneration apparatus; an evaporation and concentration apparatus that heats concentrated residue generated from the first reclaimer to generate steam, and heats and concentrates the concentrated residue; and a gas and liquid separation apparatus that separates the steam generated from the evaporation and concentration apparatus into a gas and condensate water, and returns the gas to the pre-treatment apparatus and the condensate water to the absorption apparatus.

According to a second aspect of the present invention, a $CO_2$ recovery method includes cooling an exhaust gas by a pre-treatment apparatus; bringing, by an absorption apparatus, the exhaust gas treated by the pre-treatment apparatus into contact with a $CO_2$ absorption liquid so that $CO_2$ in the exhaust gas is absorbed into the $CO_2$ absorption liquid; receiving the $CO_2$ absorption liquid treated in the absorption apparatus and heating, by a regeneration apparatus, the $CO_2$ absorption liquid to separate $CO_2$ from the $CO_2$ absorption liquid; circulating the $CO_2$ absorption liquid between the absorption apparatus and the regeneration apparatus through an absorption liquid circulation path to perform removal of $CO_2$ from the exhaust gas and recovery of $CO_2$ from the $CO_2$ absorption liquid; and removing, by an impurity removal unit, impurities dissolved in the $CO_2$ absorption liquid and having a high concentration in the absorption liquid circulation path from the exhaust gas, in the absorption liquid circulation path and/or in the pre-treatment apparatus in advance.

Effects of the Invention

In the $CO_2$ recovery system and the $CO_2$ recovery method described above, it is possible to remove, from the exhaust gas, impurities that are dissolved in the $CO_2$ absorption liquid and have a high concentration in the absorption liquid circulation path, using the impurity removal unit in the absorption liquid circulation path and/or the pre-treatment apparatus in advance even when the removal of $CO_2$ from the exhaust gas and the recovery (regeneration) of $CO_2$ from the $CO_2$ absorption liquid are performed while circulating the $CO_2$ absorption liquid between the absorption apparatus and the regeneration apparatus through the absorption liquid circulation path.

Thus, according to the $CO_2$ recovery system and the $CO_2$ recovery method described above, it is possible to prevent harmful substances (impurities) such as selenium from being dissolved in the $CO_2$ absorption liquid and having a high concentration, unlike the related art.

Further, it is possible to reduce the work and cost required, for example, to treat waste generated accompanying the operation of the $CO_2$ recovery system, exchange of the $CO_2$ absorption liquid, and maintenance of various apparatuses.

MODE(S) FOR CARRYING OUT THE INVENTION

First Embodiment

Hereinafter, a $CO_2$ recovery system and a $CO_2$ recovery method according to a first embodiment of the present invention will be described with reference to FIG. 1. Here, the $CO_2$ recovery system and the $CO_2$ recovery method of the present embodiment relate to a system for treating an exhaust gas from a boiler and a turbine burning a large amount of fossil fuel such as coal, oil, or LNG in a generation facility such as a thermal power plant, and recovering $CO_2$ from this exhaust gas. Further, the $CO_2$ recovery system and the $CO_2$ recovery method according to the present embodiment need not be used for only treating the exhaust gas generated in thermal power plant, and may also be applied to other cases in which $CO_2$ is recovered and removed from an exhaust gas.

Figure 1:
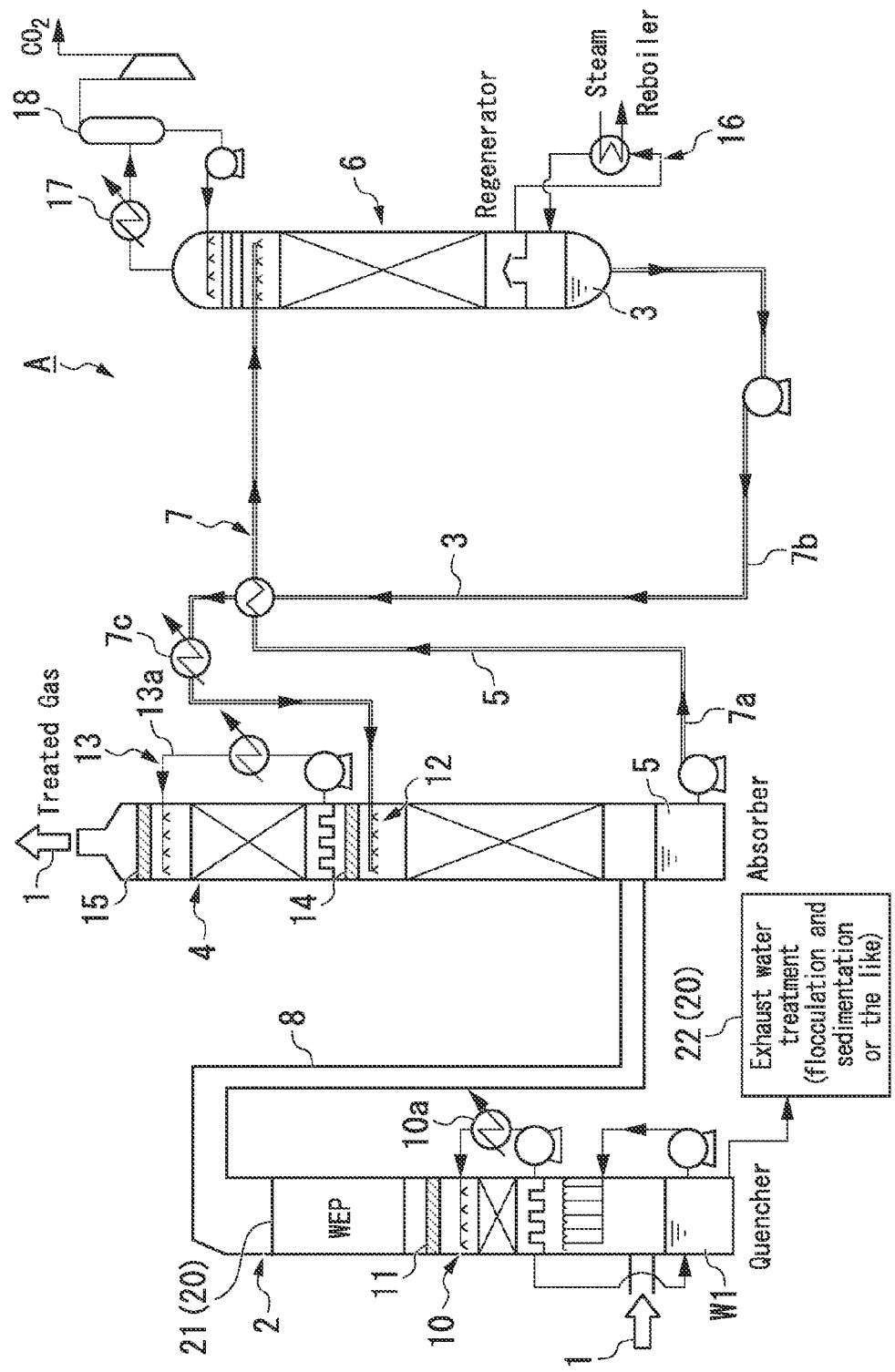
FIG. 1 is a diagram illustrating a $CO_2$ recovery system (a $CO_2$ recovery method) according to a first embodiment of the present invention.

The $CO_2$ recovery system A of the present embodiment includes a quencher (a pre-treatment apparatus) 2 that receives an exhaust gas 1 generated by burning coal or the like in a boiler, cools this exhaust gas 1, and removes gasified harmful substances (impurities) such as sulfur compounds in the exhaust gas 1; an absorber (an absorption apparatus) 4 that receives the exhaust gas 1 treated by the quencher 2 and brings the exhaust gas 1 into contact with a $CO_2$ absorption liquid (lean solvent) 3 to remove $CO_2$ from the exhaust gas 1; and a regenerator (a regeneration apparatus) 6 that receives and heats the $CO_2$ absorption liquid (rich solvent) 5 having absorbed $CO_2$ in the absorber 4 and separates and recovers $CO_2$ absorbed into the $CO_2$ absorption liquid 5, as shown in FIG. 1.

Further, in the quencher 2, the exhaust gas 1 from the boiler is introduced into a lower part and circulated from the lower part to an upper part, and the treated exhaust gas 1 is supplied to the absorber 4 through a communication duct 8 connected to the upper part. Further, the quencher 2 includes a washing scrubber (a scrubber) 10. Washing water is sprayed from the upper part to the inside of the quencher 2 in a mist form by a pump, and this washing water and the exhaust gas 1 are brought into contact with each other. Accordingly, gaseous harmful substances or the like in the exhaust gas 1 are dissolved in the washing water and trapped. Further, the washing water W1 having trapped the harmful substances or the like falls to the lower part of the quencher 2 and is accumulated. Further, in the quencher 2, the washing water W1 accumulated in the lower part is pumped up by a pump and sprayed by the washing scrubber, and the exhaust gas 1 is pre-treated while circulating the washing water W1.

Further, a condenser 10a that cools the water sprayed by the washing scrubber 10 is provided. In order to increase efficiency when the $CO_2$ absorption liquid 3 is brought into contact with the exhaust gas 1 to absorb and remove $CO_2$ in the absorber 4 of a subsequent stage, the washing water W1 is cooled by the condenser 10a and the exhaust gas 1 is brought into contact with this washing water W1 so that a temperature of the exhaust gas 1 is equal to or lower than a predetermined temperature. Further, in the quencher 2, a demister 11 is provided above the washing scrubber 10. The exhaust gas 1 treated by the washing scrubber 10 passes through the demister 11, thereby condensate water or the like of the exhaust gas is removed.

In the absorber 4, the exhaust gas 1 pre-treated by the quencher 2 is introduced into a lower part through the communication duct 8, flows from the lower part to an upper part, and is brought into contact with the $CO_2$ absorption liquid 3. Accordingly, $CO_2$ in the exhaust gas is removed, and the exhaust gas 1 from which $CO_2$ has been removed is exhausted as a treated gas from the upper part to the outside.

Further, an absorption liquid scrubber 12 that sprays the $CO_2$ absorption liquid (amine-based $CO_2$ absorption liquid) 3 is provided in the absorber 2 of the present embodiment. The $CO_2$ absorption liquid 3 sprayed from the absorption liquid scrubber 12 and the exhaust gas 1 flowing from the lower part to the upper part are brought into contact with each other. Accordingly, $CO_2$ in the exhaust gas 1 is dissolved in the $CO_2$ absorption liquid 3 and removed. Further, the $CO_2$ absorption liquid 5 having absorbed $CO_2$ is accumulated in the lower part of the absorber 4.

Here, for example, an amine-based absorption liquid may be adopted as the $CO_2$ absorption liquid. Specifically, an alkanolamine such as monoethanolamine, diethanolamine, triethanolamine, methyldiethanolamine, diisopropanolamine, or diglycolamine may be adopted as the $CO_2$ absorption liquid. Further, hindered amines may be adopted. Further, each water solution of the material or a water solution obtained by mixing two or more of the materials may be used as the $CO_2$ absorption liquid.

Further, in the absorber 4, a washing scrubber 13 that sprays the washing water cooled by the condenser and a pump are provided above the absorption liquid scrubber 12. Accordingly, impurities (containing harmful substances) in the exhaust gas 1 which have not been absorbed by the $CO_2$ absorption liquid 3 are trapped and removed by the washing water. Further, a pair of demisters 14 and 15 is provided above the absorption liquid scrubber 12 and below the washing scrubber 13 at intervals in a vertical direction. Condensate water or the like in the exhaust gas 1 is removed by the demisters 14 and 15. Accordingly, a more reliably cleaned exhaust gas 1 is exhausted to the outside.

Further, in the absorber 4, an absorption liquid transportation pipe 7a for supplying the $CO_2$ absorption liquid 5 accumulated in the lower part to the regenerator 6 is connected to the lower part, and a liquid supply pump is provided in the absorption liquid transportation pipe 7a. Further, an absorption liquid supply pipe 7b that supplies the $CO_2$ absorption liquid 3 to the absorption liquid scrubber 12 is connected to the absorber 4. Also, an absorption liquid circulation path 7 through which the $CO_2$ absorption liquids 3 and 5 are circulated is formed of the absorption liquid transportation pipe 7a, the absorption liquid supply pipe 7b, the inside of the absorber 4, and the inside of the regenerator 6.

The regenerator 6 separates and recovers $CO_2$ from the $CO_2$ absorption liquid 5 that has absorbed $CO_2$ or the like in the absorber 4. The absorption liquid transportation pipe 7a for introducing the $CO_2$ absorption liquid 5 from the absorber 4 is connected to an upper part of the regenerator 6. Also, the $CO_2$ absorption liquid 5 accumulated in the lower part of the absorber 4 is sprayed and supplied from the upper part side to the inside of the regenerator 6 by driving the liquid transportation pump of the absorption liquid transportation pipe 7a.

Further, high temperature steam is supplied from the lower part to the regenerator 6 by the reboiler 16, and the sprayed $CO_2$ absorption liquid 5 is heated. Accordingly, $CO_2$ is dissociated from the $CO_2$ absorption liquid 5 and gasified, and gasified $CO_2$ is led out from the upper part of the regenerator 6 to the outside.

Further, dissociated $CO_2$ is cooled in the condenser 17, compressed in the $CO_2$ compressor 18, and treated. Condensate water generated by treating $CO_2$ in this way is returned to the regenerator 6. Meanwhile, the $CO_2$ absorption liquid 3 from which $CO_2$ has been dissociated and removed is accumulated in the lower part of the regenerator 6, and is sent to the absorber 4 by driving a return pump provided in the absorption liquid supply pipe 7b. Further, in this case, the $CO_2$ absorption liquid 3 is cooled in the condenser 7c, supplied to the absorber 4, sprayed from the absorption liquid scrubber 12 to absorb $CO_2$ again, and accumulated in the lower part of the absorber 4.

Meanwhile, harmful impurities (harmful substances) contained in the exhaust gas 1 may not be removed either in the quencher 2 or in the absorber 4 but may be brought into contact with the $CO_2$ absorption liquid 3 and dissolved in the $CO_2$ absorption liquid 3. Examples of such impurities include selenium, arsenic, cadmium, lead, hexavalent chromium, mercury, copper, fluorine, and boron. Further, such harmful impurities, particularly selenium, are not removed either in the quencher 2 or in the absorber 4 and are easily dissolved in the $CO_2$ absorption liquids 3 and 5. The concentration of the impurities is gradually increased by circulating the $CO_2$ absorption liquids 3 and 5 between the absorber 4 and the regenerator 6.

In contrast, in the $CO_2$ recovery system (and the $CO_2$ recovery method) of the present embodiment, an impurity removal unit 20 for removing harmful impurities in the exhaust gas 1 is included. Further, the impurity removal unit 20 of the present embodiment includes a wet electrostatic precipitator 21 embedded above the demister 11 of the quencher 2, i.e., a top part of the quencher 2.

Further, when the electrostatic precipitator 21 is provided in this way, dust (dust containing solid harmful impurities; solid) in the exhaust gas 1 supplied to the quencher 2 is trapped by the electrostatic precipitator 21. Accordingly, the harmful impurities such as solid selenium are removed from the exhaust gas 1 by the electrostatic precipitator 21, and the exhaust gas 1 containing no harmful impurities such as solid selenium or having a reduced content of the harmful impurities is supplied from the quencher 2 to the absorber 4 through the communication duct 8. Accordingly, when the $CO_2$ absorption liquid 3 is brought into contact with the exhaust gas 1, the harmful impurities such as selenium as well as $CO_2$ are not captured and dissolved in the $CO_2$ absorption liquids 3 and 5.

Meanwhile, when the electrostatic precipitator 21 is provided in the quencher 2 to trap dust including harmful impurities, harmful materials such as heavy metals are dissolved and contained even in the washing water sprayed by the washing scrubber 10 and accumulated in the lower part of the quencher 2.

Accordingly, the impurity removal unit 20 of the present embodiment includes an exhaust water treatment apparatus 22 that appropriately exhausts the washing water W1 accumulated in the lower part of the quencher 2, and adjusts pH or adds an inorganic coagulant such as ferric chloride or polyferric sulfate or a polymer coagulant such as PAC to coagulate, sediment and treat harmful substances contained in the washing water W1. Further, in this case, it is possible to use the $CO_2$ recovered in the $CO_2$ recovery system A when pH of the washing water W1 of a treatment target is adjusted. Accordingly, the harmful impurities can be recovered from the exhaust gas 1 before the exhaust gas 1 is supplied from the quencher 2 to the absorber 4, and the harmful impurities such as selenium can be prevented from having a high concentration in the $CO_2$ absorption liquids 3 and 5.

Thus, in the $CO_2$ recovery system A and the $CO_2$ recovery method of the present embodiment, it is possible to remove, from the exhaust gas 1, the impurities such as selenium dissolved in the $CO_2$ absorption liquid 3 and having a high concentration in the absorption liquid circulation path 7 by the electrostatic precipitator 21 or the exhaust water treatment apparatus 22 of the impurity removal unit 20 in the quencher (pre-treatment apparatus) 2 in advance even when the removal of $CO_2$ from the exhaust gas 1 and the recovery (regeneration) of $CO_2$ from the $CO_2$ absorption liquid 5 are performed while circulating the $CO_2$ absorption liquids 3 and 5 between the absorber 4 and the regenerator 6 through the absorption liquid circulation path 7.

Accordingly, the $CO_2$ recovery system A and the $CO_2$ recovery method of the present embodiment can prevent harmful impurities such as selenium from being dissolved in the $CO_2$ absorption liquids 3 and 5 and having a high concentration, unlike the related art. Further, it is possible to reduce the workload and cost required, for example, to treat waste generated accompanying the operation of the $CO_2$ recovery system A, exchange of the $CO_2$ absorption liquids 3 and 5, and maintenance of various apparatuses (each tower).

Second Embodiment

Next, a $CO_2$ recovery system and a $CO_2$ recovery method according to a second embodiment of the present invention will be described with reference to FIG. 2. Here, the $CO_2$ recovery system of the present embodiment is configured similarly to that of the first embodiment except for the impurity removal unit. Accordingly, in the present embodiment, the same components as those in the first embodiment are denoted by the same reference numerals and a detailed description thereof will be omitted.

Figure 2:
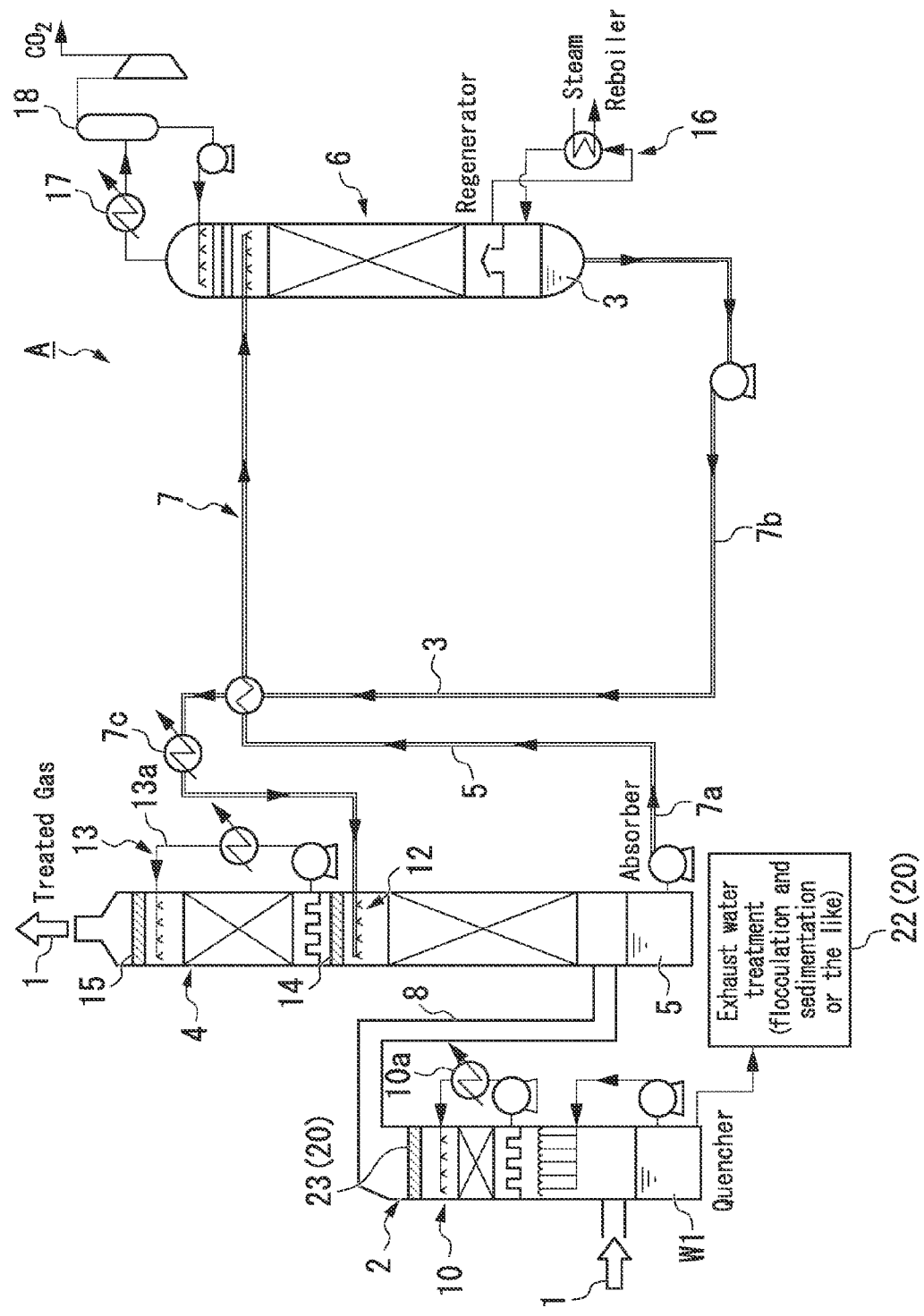
FIG. 2 is a diagram illustrating a $CO_2$ recovery system (a $CO_2$ recovery method) according to a second embodiment of the present invention.

The $CO_2$ recovery system A of the present embodiment includes a quencher 2 that receives an exhaust gas 1 generated by burning coal or the like in a boiler, cools this exhaust gas 1, and removes impurities such as sulfur compounds in the exhaust gas 1, an absorber 4 that receives the exhaust gas 1 treated in the quencher 2 and brings this exhaust gas 1 into contact with the $CO_2$ absorption liquid 3 to remove $CO_2$, and a regenerator 6 that receives the $CO_2$ absorption liquid 5 that has absorbed $CO_2$ in the absorber 4 and separates and recovers $CO_2$ absorbed into the $CO_2$ absorption liquid 5, similar to the first embodiment, as shown in FIG. 2.

Meanwhile, the $CO_2$ recovery system A of the present embodiment includes an impurity removal demister 23 disposed above a washing scrubber 10 of the quencher 2 as an impurity removal unit 20. The impurity removal demister 23 is formed of a wire material of a metal or a plastic in a mesh form (a filter form), and it is preferable to use, for example, a demister by which impurities having an average particle diameter of about 1.0 µm can be trapped according to impurities to be removed. Further, the demister may have a two-layer structure.

Further, in the $CO_2$ recovery system A and the $CO_2$ recovery method of the present embodiment, by including the impurity removal demister 23 in the quencher 2, dust (dust containing solid harmful impurities) in the exhaust gas 1 supplied to the quencher 2 is trapped by the impurity removal demister 23. Further, the impurities trapped by the impurity removal demister 23 fall to the lower part of the quencher 2 together with water drops. Accordingly, the harmful impurities such as selenium are not contained in the exhaust gas 1 supplied from the quencher 2 to the absorber 4 through the communication duct 8 or content thereof is reduced. Thereby, when the $CO_2$ absorption liquid 3 is brought into contact with the exhaust gas 1, the harmful impurities such as selenium as well as $CO_2$ are not captured into the $CO_2$ absorption liquid 3. Or, it becomes difficult for the harmful impurities such as selenium as well as $CO_2$ to be captured.

Further, the impurity removal unit 20 of the present embodiment includes an exhaust water treatment apparatus 22 that appropriately exhausts the washing water W1 accumulated in the lower part of the quencher 2 and coagulates, sediments and treats the harmful substances contained in the washing water W1. Accordingly, the impurities trapped by the impurity removal demister 23, falling to the lower part of the quencher 2 together with water drops and accumulated in the washing water W1 are reliably recovered and removed in the exhaust water treatment apparatus 22.

Thus, even in the $CO_2$ recovery system A and the $CO_2$ recovery method of the present embodiment, it is possible to remove, from the exhaust gas 1, the impurities such as selenium dissolved in the $CO_2$ absorption liquid 3 and having a high concentration in the absorption liquid circulation path 7 by the impurity removal demister 23 and the exhaust water treatment apparatus 22 of the impurity removal unit 20, in the quencher 2 in advance, even when the removal of $CO_2$ from the exhaust gas 1 and recovery (regeneration) of $CO_2$ from the $CO_2$ absorption liquid 5 are performed while circulating the $CO_2$ absorption liquids 3 and 5 between the absorber 4 and the regenerator 6 through the absorption liquid circulation path 7, similar to the first embodiment.

Further, according to the $CO_2$ recovery system A and the $CO_2$ recovery method of the present embodiment, it is possible to prevent the harmful impurities such as selenium from being dissolved in the $CO_2$ absorption liquids 3 and 5 and having a high concentration, unlike the related art. Further, it is possible to reduce the workload and cost required, for example, to treat waste generated accompanying the operation of the $CO_2$ recovery system A, exchange of the $CO_2$ absorption liquids 3 and 5, and maintenance of various apparatuses (each tower).

Third Embodiment

Next, a $CO_2$ recovery system and a $CO_2$ recovery method according to a third embodiment of the present invention will be described with reference to FIG. 3. Here, the $CO_2$ recovery system of the present embodiment is configured similarly to those of the first and second embodiments except for the impurity removal unit. Accordingly, in the present embodiment, the same components as those in the first and second embodiments are denoted by the same reference numerals and a detailed description thereof will be omitted.

Figure 3:
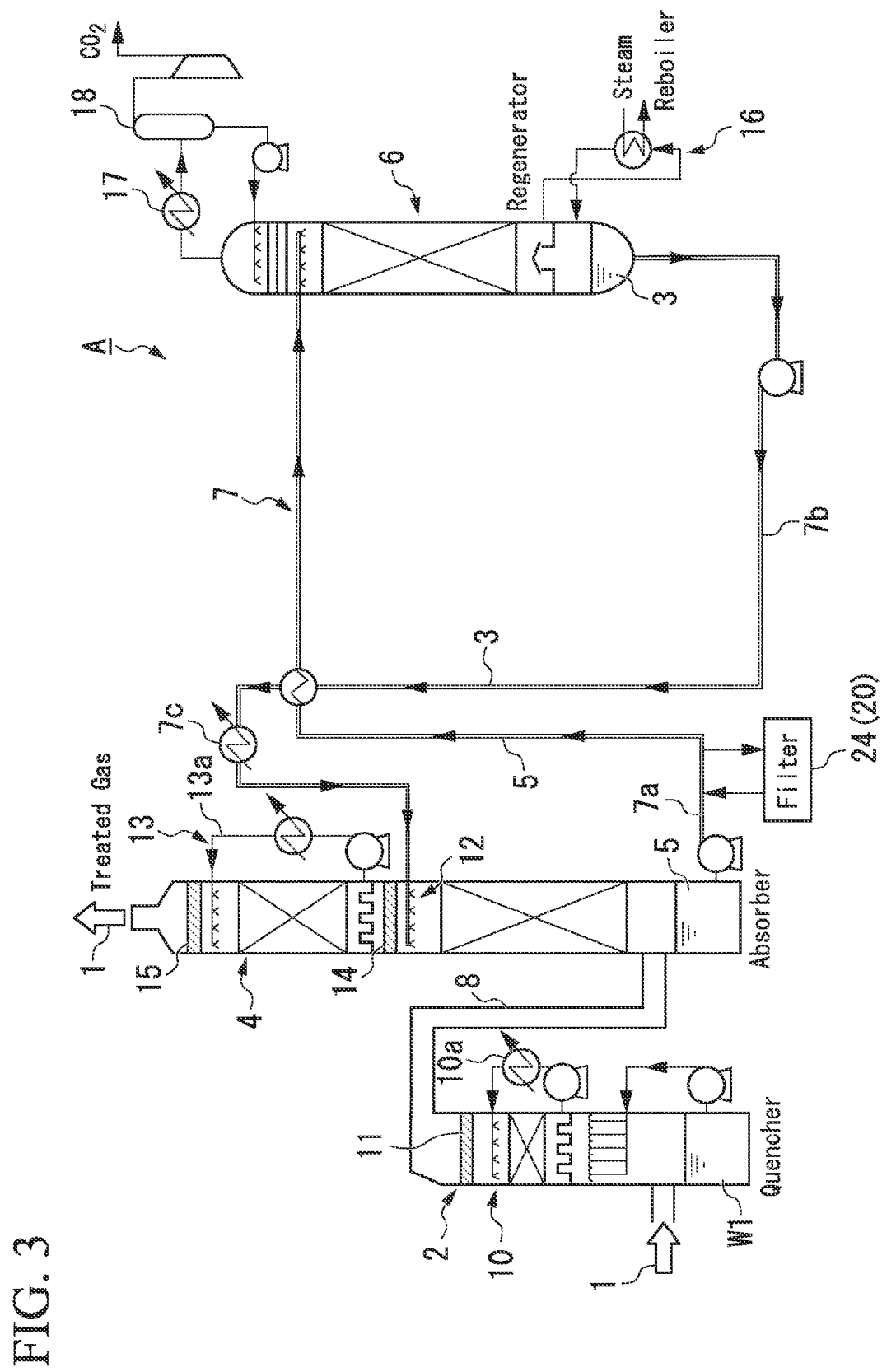
FIG. 3 is a diagram illustrating a $CO_2$ recovery system (a $CO_2$ recovery method) according to a third embodiment of the present invention.

The $CO_2$ recovery system A of the present embodiment includes a quencher 2 that cools an exhaust gas 1 and removes impurities such as sulfur compounds in the exhaust gas 1, an absorber 4 that brings the exhaust gas 1 treated by the quencher 2 into contact with a $CO_2$ absorption liquid 3 to remove $CO_2$, and a regenerator 6 that receives the $CO_2$ absorption liquid 5 that has absorbed $CO_2$ in the absorber 4 and separates and recovers $CO_2$ absorbed into the $CO_2$ absorption liquid 5, similar to the first and second embodiments, as shown in FIG. 3.

Meanwhile, in the $CO_2$ recovery system A of the present embodiment, a filtering apparatus 24 is provided as the impurity removal unit 20 in an absorption liquid transportation pipe 7a of an absorption liquid circulation path 7 that sends the $CO_2$ absorption liquid 5 having absorbed $CO_2$ from the absorber 4 to the regenerator 6. In other words, in the $CO_2$ recovery system A and the $CO_2$ recovery method of the present embodiment, the $CO_2$ absorption liquid (rich solvent) 5 flowing in the absorption liquid transportation pipe 7a is filtered in the filtering apparatus 24 before the $CO_2$ absorption liquid is sent to the regenerator 6.

Accordingly, even when harmful impurities (e.g., dust) are supplied from the quencher 2 to the absorber 4 and the harmful impurities are captured in the $CO_2$ absorption liquid 5, it is possible to trap the impurities and remove the impurities from the $CO_2$ absorption liquid 5 by the filtering apparatus 24 before the impurities are sent to the regenerator 6.

Thus, in the $CO_2$ recovery system A and the $CO_2$ recovery method of the present embodiment, it is possible to remove, from the exhaust gas 1, impurities such as selenium dissolved in the $CO_2$ absorption liquid 3 and having a high concentration in the absorption liquid circulation path 7, by the filtering apparatus 24 of the impurity removal unit 20 in the absorption liquid circulation path 7 even when the removal of $CO_2$ from the exhaust gas 1 and recovery (regeneration) of $CO_2$ from the $CO_2$ absorption liquid 5 are performed while circulating the $CO_2$ absorption liquids 3 and 5 between the absorber 4 and the regenerator 6 through the absorption liquid circulation path 7.

Accordingly, the $CO_2$ recovery system A and the $CO_2$ recovery method of the present embodiment can prevent harmful impurities such as selenium from being dissolved in the $CO_2$ absorption liquids 3 and 5 and having a high concentration, unlike the related art. Further, it is possible to reduce the workload and cost required, for example, to treat waste generated accompanying the operation of the $CO_2$ recovery system A, exchange of the $CO_2$ absorption liquids 3 and 5, and maintenance of various apparatuses (each tower).

Fourth Embodiment

Next, a $CO_2$ recovery system and a $CO_2$ recovery method according to a fourth embodiment of the present invention will be described with reference to FIG. 4. The $CO_2$ recovery system of the present embodiment is configured similar to those of the first to third embodiments except for the impurity removal unit. Accordingly, in the present embodiment, the same components as those in the first to third embodiments are denoted by the same reference numerals and a detailed description thereof will be omitted.

Figure 4:
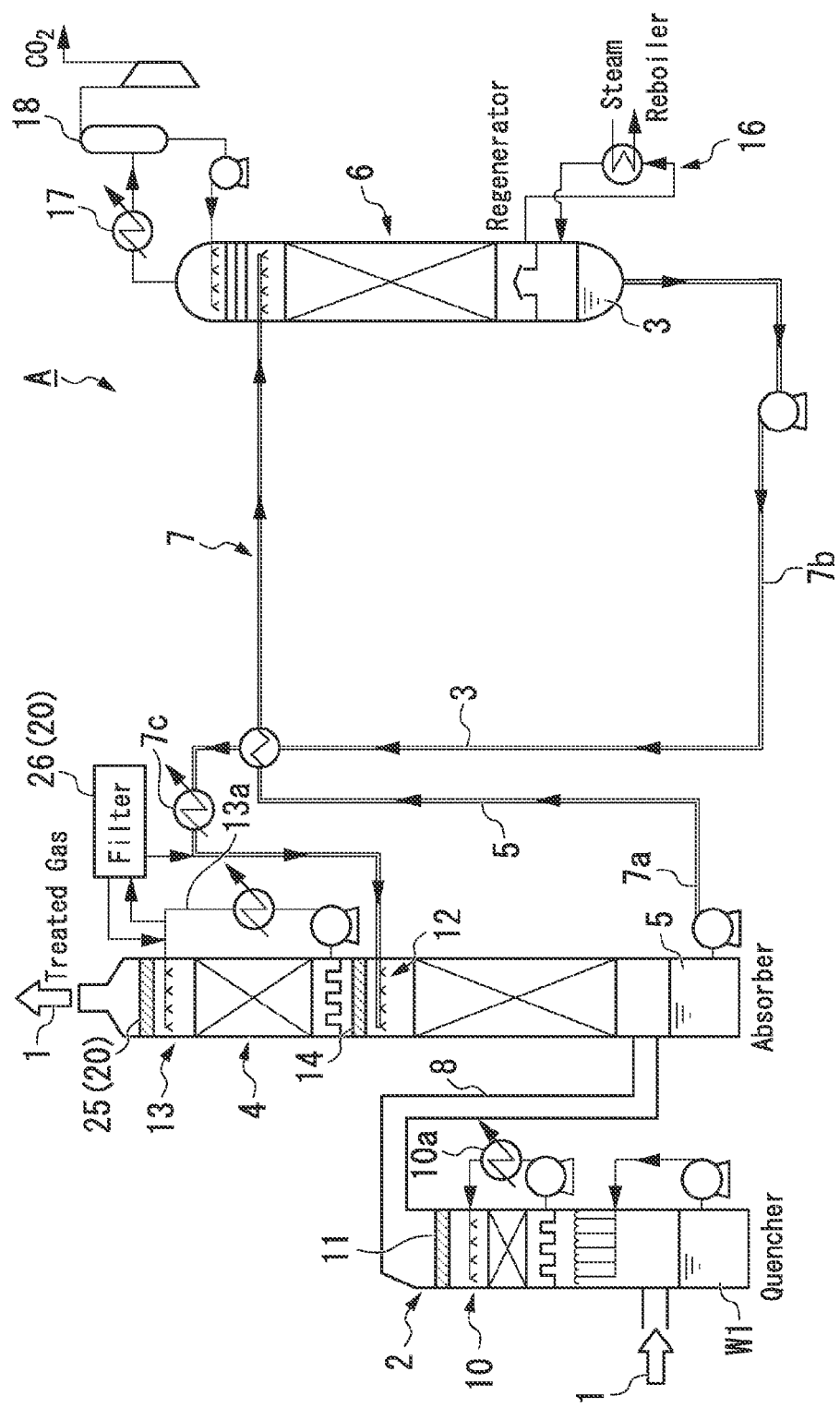
FIG. 4 is a diagram illustrating a $CO_2$ recovery system (a $CO_2$ recovery method) according to a fourth embodiment of the present invention.

A $CO_2$ recovery system A of the present embodiment includes a quencher 2 that cools an exhaust gas 1 and removes impurities such as sulfur compounds in the exhaust gas 1, an absorber 4 that brings the exhaust gas 1 treated in the quencher 2 into contact with a $CO_2$ absorption liquid 3 to remove $CO_2$, and a regenerator 6 that receives the $CO_2$ absorption liquid 5 that has absorbed $CO_2$ in the absorber 4 and separates and recovers $CO_2$ absorbed into the $CO_2$ absorption liquid 5, similar to the first to third embodiments, as shown in FIG. 4.

Meanwhile, the $CO_2$ recovery system A of the present embodiment includes an impurity removal demister 25 disposed above a washing scrubber 10 of the quencher 2 as an impurity removal unit 20. The impurity removal demister 25 is formed of a wire material of a metal or a plastic in a mesh form (a filter form), and it is preferable to use, for example, a demister by which impurities having an average particle diameter of about 1.0 μm can be trapped according to impurities to be removed. Further, the demister may have a two-layer structure.

Further, the impurity removal unit 20 of the present embodiment includes a filtering apparatus 26 that filters the washing water sprayed in a washing scrubber 13 of the absorber 4 to remove harmful impurities contained in the washing water and returns the filtered washing water to a washing water circulation path 13a of the washing scrubber 13 of the absorber 4 and (or) an absorption liquid supply pipe 7b of an absorption liquid circulation path 7.

In the $CO_2$ recovery system A and the $CO_2$ recovery method of the present embodiment, by including the impurity removal demister 25 above the washing scrubber 13 of the absorber 4, harmful impurities in the exhaust gas 1 supplied to the absorber 4 are trapped by the impurity removal demister 25. Further, the impurities trapped by the impurity removal demister 25 fall together with water drops and are accumulated in the washing water of the washing scrubber 13 of the absorber 4.

Further, since the washing water of the washing scrubber 13 of the absorber 4 is filtered by the filtering apparatus 26, the impurities are recovered and removed. Further, the treated water filtered and cleaned by the filtering apparatus 26 is returned to the washing water circulation path 13a as washing water of the washing scrubber 13. And (or) this treated water is returned to the absorption liquid supply pipe 7b of the absorption liquid circulation path 7 and returned to the absorber 4 as the $CO_2$ absorption liquid (lean solvent) 3.

Accordingly, even when harmful impurities (e.g., dust) are supplied from the quencher 2 to the absorber 4 and captured into the $CO_2$ absorption liquid 5, it is possible to trap the impurities in the impurity removal demister 25 and remove the impurities in the filtering apparatus 26.

Thus, in the $CO_2$ recovery system A and the $CO_2$ recovery method of the present embodiment, it is possible to remove the impurities in the exhaust gas 1 by the impurity removal demister 25 and the filtering apparatus 26 of the impurity removal unit 20 even when the removal of $CO_2$ from the exhaust gas 1 and the recovery (regeneration) of $CO_2$ from the $CO_2$ absorption liquid 5 are performed while circulating the $CO_2$ absorption liquids 3 and 5 between the absorber 4 and the regenerator 6 through the absorption liquid circulation path 7.

Accordingly, the $CO_2$ recovery system A and the $CO_2$ recovery method of the present embodiment can prevent harmful impurities such as selenium from being dissolved in the $CO_2$ absorption liquids 3 and 5 and having a high concentration, unlike the related art. Further, it is possible to reduce the workload and cost required, for example, to treat waste generated accompanying the operation of the $CO_2$ recovery system A, exchange of the $CO_2$ absorption liquids 3 and 5, and maintenance of various apparatuses (each tower).

Fifth Embodiment

Next, a $CO_2$ recovery system and a $CO_2$ recovery method according to a fifth embodiment of the present invention will be described with reference to FIG. 5. In the present embodiment, the same components as those in the first to fourth embodiments are denoted by the same reference numerals and a detailed description thereof will be omitted.

Figure 5:
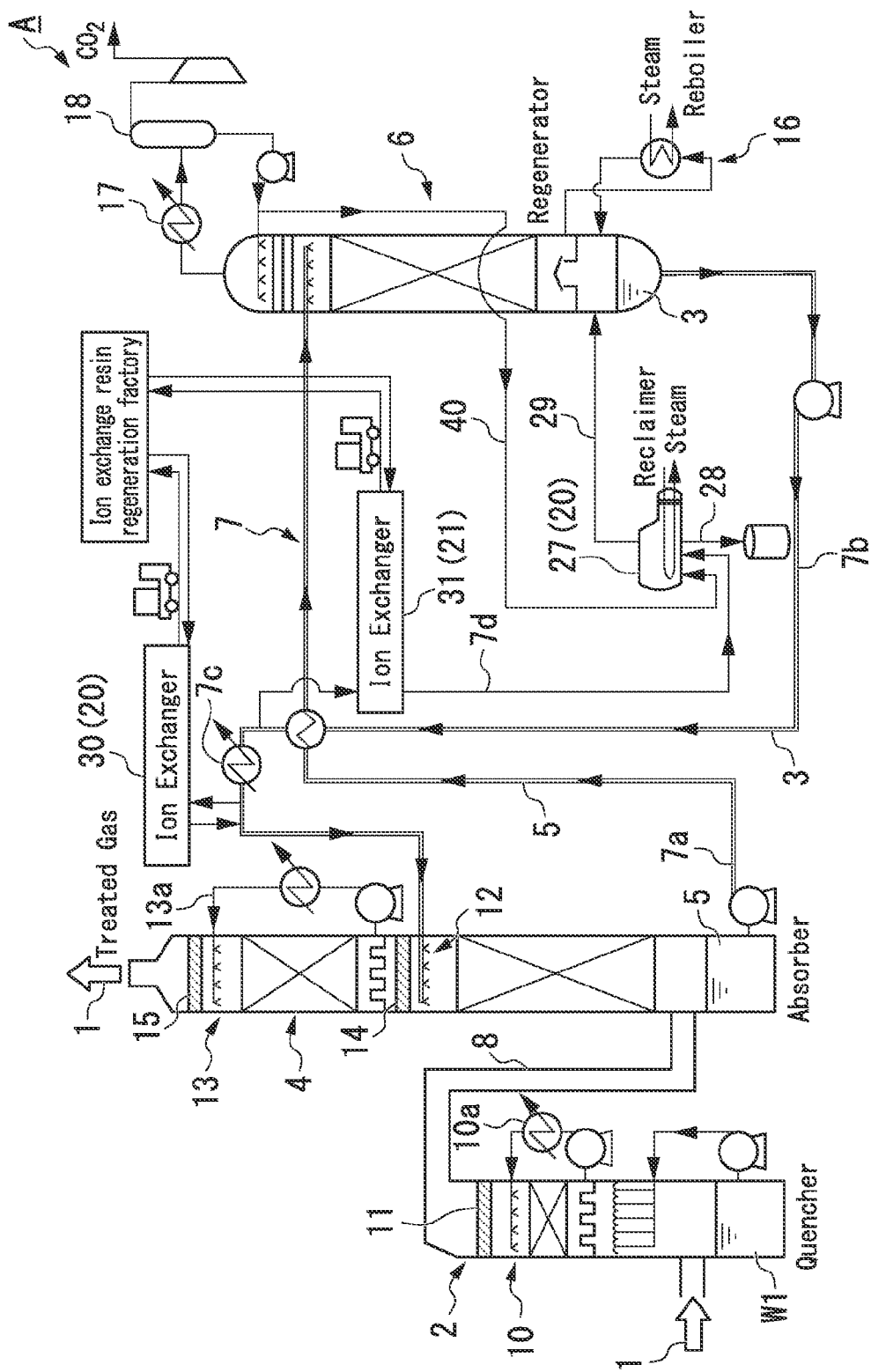
FIG. 5 is a diagram illustrating a $CO_2$ recovery system (a $CO_2$ recovery method) according to a fifth embodiment of the present invention.

A $CO_2$ recovery system A of the present embodiment includes a quencher 2 that cools an exhaust gas 1 and removes impurities such as sulfur compounds in the exhaust gas 1, an absorber 4 that brings the exhaust gas 1 treated by the quencher 2 into contact with the $CO_2$ absorption liquid 3 to remove $CO_2$, and a regenerator 6 that receives the $CO_2$ absorption liquid 5 that has absorbed $CO_2$ in the absorber 4 and separates and recovers $CO_2$ absorbed into the $CO_2$ absorption liquid 5, similar to the first to fourth embodiments as shown in FIG. 5.

Here, when $SO_X$ or the like is not removed in the quencher 2 but remains in the exhaust gas 1, $SO_X$ or the like may react to an alkanolamine contained in the $CO_2$ absorption liquid 5 in the regenerator 6 to generate a thermostable salt or when $SO_X$ or the like is brought into contact with the $CO_2$ absorption liquid 3 in the absorber 4, amine may deteriorate due to oxygen to generate a thermostable salt. The thermostable salt may be contained in the $CO_2$ absorption liquids 3 and 5.

In contrast, in the $CO_2$ recovery system A of the present embodiment, an absorption liquid drawing path 7d is branched and provided from an absorption liquid supply pipe 7b of an absorption liquid circulation path 7 that supplies $CO_2$ absorption liquid (lean solvent) 3 from the regenerator 6 to the absorber 4. Further, the $CO_2$ recovery system A includes, as an impurity removal unit 20, a reclaimer 27 that draws the $CO_2$ absorption liquid 3 from the absorption liquid circulation path 7 through the absorption liquid drawing path 7d, heats the $CO_2$ absorption liquid 3, for example, at 130 to 150° C. using steam, and heats and concentrates impurities remaining in the $CO_2$ absorption liquid 3. When the $CO_2$ absorption liquid 3 is treated in the reclaimer 27, the $CO_2$ absorption liquid 3 is separated into concentrated residue 28 and condensate water 29. The condensate water 29 is returned to the regenerator 6 and used as the $CO_2$ absorption liquid 3, and the concentrated residue 28 is exhausted from a waste discharge line to the outside, for example, using a pump, and treated.

Further, the impurity removal unit 20 of the present embodiment includes a first ion-exchange apparatus 30 that treats, using an ion-exchange resin, the $CO_2$ absorption liquid 3 of the absorption liquid circulation path 7 of the absorber 4 side rather than a branch part of the absorption liquid drawing path 7d of the absorption liquid supply pipe 7b. Further, the impurity removal unit 20 includes a second ion-exchange apparatus 31 that treats the $CO_2$ absorption liquid 3 of the absorption liquid drawing path 7d using an ion-exchange resin. For example, the first ion-exchange apparatus 30 and the second ion-exchange apparatus 31 include an anion-based ion-exchange resin.

Further, in the $CO_2$ recovery system A and the $CO_2$ recovery method of the present embodiment, first, it is possible to separate the condensate water 29 and the concentrated residue 28 by drawing the $CO_2$ absorption liquid 3 through the absorption liquid drawing path 7d and treating the $CO_2$ absorption liquid 3 in the reclaimer 27, and to remove harmful impurities and impurities causing the thermostable salt by exhausting the concentrated residue 28 to the outside of the system.

Further, it is possible to effectively trap and remove, particularly, the impurities such as selenium by treating the $CO_2$ absorption liquid 3 in the first ion-exchange apparatus 30 and the second ion-exchange apparatus 31 and by including the anion-based ion-exchange resin in the ion-exchange apparatuses 30 and 31. Further, the ion-exchange resin of the first ion-exchange apparatus 30 and the second ion-exchange apparatus 31 can be used while being appropriately regenerated at an ion-exchange resin regeneration factory. Accordingly, it is possible to reduce an amount of the waste, or it becomes unnecessary to dispose the resin as waste.

Thus, in the $CO_2$ recovery system A and the $CO_2$ recovery method of the present embodiment, it is possible to remove the impurities in the exhaust gas 1 by the reclaimer 27, the first ion-exchange apparatus 30, and the second ion-exchange apparatus 31 of the impurity removal unit 20 even when the removal of $CO_2$ from the exhaust gas 1 and the recovery (regeneration) of $CO_2$ from the $CO_2$ absorption liquid 5 are performed while circulating the $CO_2$ absorption liquids 3 and 5 between the absorber 4 and the regenerator 6 through the absorption liquid circulation path 7.

Accordingly, the $CO_2$ recovery system A and the $CO_2$ recovery method of the present embodiment can prevent harmful impurities such as selenium from being dissolved in the $CO_2$ absorption liquids 3 and 5 and having a high concentration, unlike the related art. Further, it is possible to reduce the workload and cost required, for example, to treat waste generated accompanying the operation of the $CO_2$ recovery system A, exchange of the $CO_2$ absorption liquids 3 and 5, and maintenance of various apparatuses (each tower).

Further, since an impurity concentration in the reclaimer 27 is lowered by including the second ion-exchange apparatus 31, it is possible to increase a concentrating effect (concentrating magnification) of the reclaimer 27 and to improve efficiency of the reclaiming operation, i.e., increase throughput each time by the reclaimer 27.

Sixth Embodiment

Next, a $CO_2$ recovery system and a $CO_2$ recovery method according to a sixth embodiment of the present invention will be described with reference to FIGS. 6 and 7. In the present embodiment, the same components as those in the first to fifth embodiments are denoted by the same reference numerals and a detailed description thereof will be omitted.

Figure 6:
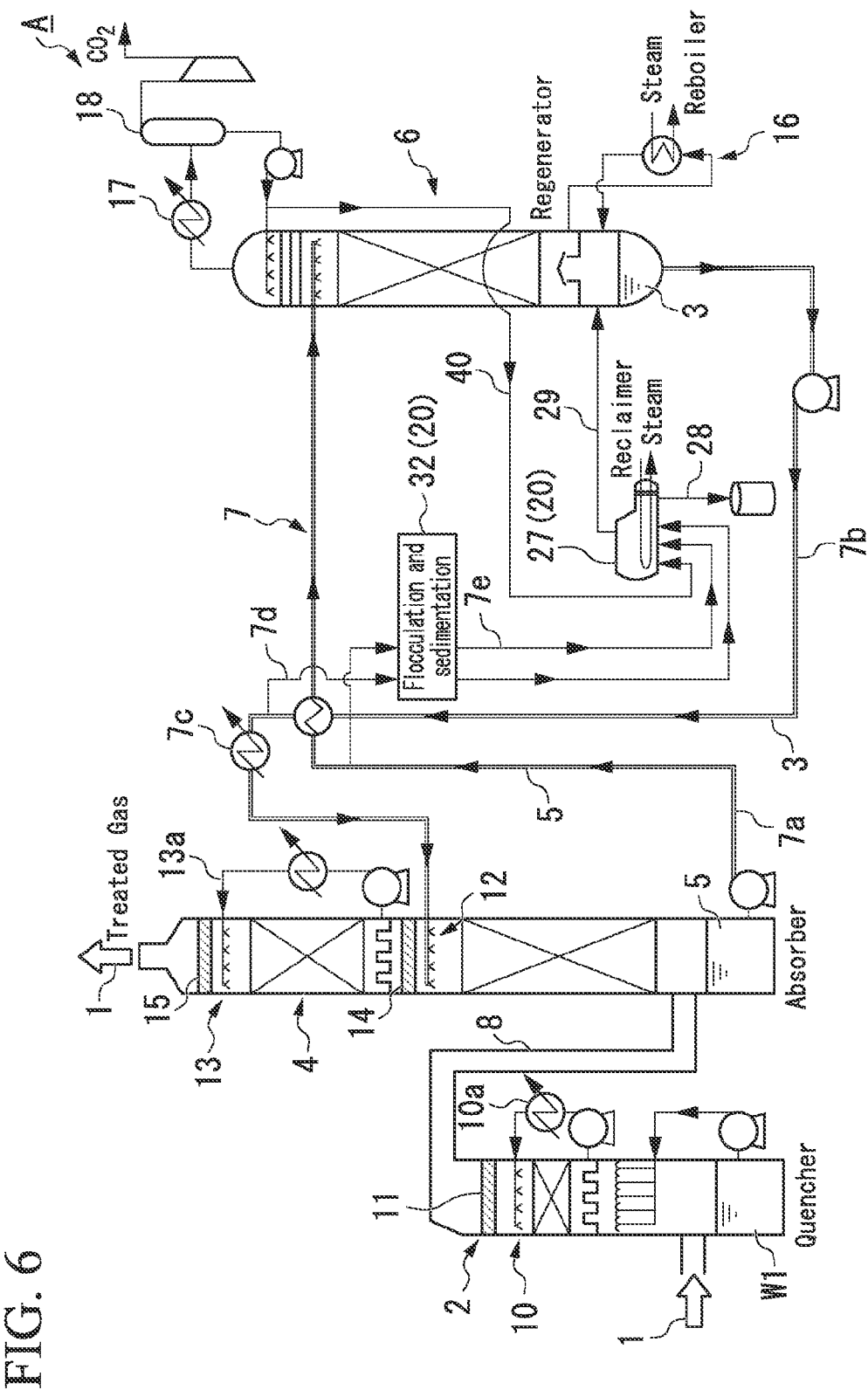
FIG. 6 is a diagram illustrating a $CO_2$ recovery system (a $CO_2$ recovery method) according to a sixth embodiment of the present invention.

A $CO_2$ recovery system A of the present embodiment includes a quencher 2 that cools an exhaust gas 1 and removes impurities such as sulfur compounds in the exhaust gas 1, an absorber 4 that brings the exhaust gas 1 treated by the quencher 2 into contact with a $CO_2$ absorption liquid 3 to remove $CO_2$, and a regenerator 6 that receives the $CO_2$ absorption liquid 5 that has absorbed $CO_2$ in the absorber 4 and separates and removes $CO_2$ absorbed into the $CO_2$ absorption liquid 5, similar to the first to fourth embodiments, as shown in FIG. 6.

Meanwhile, in the $CO_2$ recovery system A of the present embodiment, a first absorption liquid drawing path 7d is branched and provided from an absorption liquid supply pipe 7b of an absorption liquid circulation path 7 that supplies $CO_2$ absorption liquid (lean solvent) 3 from the regenerator 6 to the absorber 4, similar to the fifth embodiment, as shown in FIG. 6. Further, a reclaimer 27 that draws the $CO_2$ absorption liquid 3 from the absorption liquid circulation path 7 through the first absorption liquid drawing path 7d, heats the $CO_2$ absorption liquid 3, for example, at 130 to 150° C. using steam, and heats and concentrates impurities remaining in the $CO_2$ absorption liquid 3 is included as an impurity removal unit 20.

Further, a second absorption liquid drawing path 7e is branched and provided from an absorption liquid transportation pipe 7a of an absorption liquid circulation path 7 that supplies the $CO_2$ absorption liquid (rich solvent) 5 from the absorber 4 to the regenerator 6. Further, this second absorption liquid drawing path 7e is also connected to the reclaimer 27 to draw the $CO_2$ absorption liquid 5 from the absorption liquid circulation path 7, and the $CO_2$ absorption liquid 5 is heated in the reclaimer 27 to heat and concentrate impurities remaining in the $CO_2$ absorption liquid 5.

Further, the impurity removal unit 20 of the present embodiment includes a coagulation sedimentation treatment apparatus 32 that coagulates and sediments the $CO_2$ absorption liquids 3 and 5 of the first absorption liquid drawing path 7d and/or the second absorption liquid drawing path 7e to remove the impurities.

Figure 7:
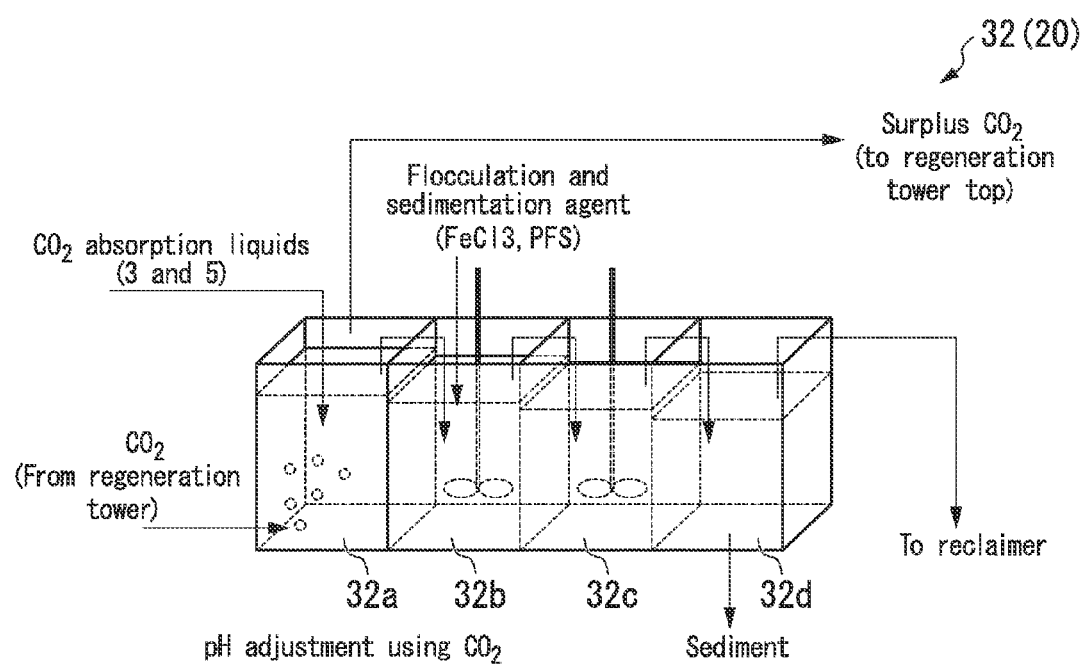
FIG. 7 is a diagram illustrating a coagulation sedimentation treatment apparatus.

The coagulation sedimentation treatment apparatus 32 includes, for example, a plurality of treatment tanks such as a pH adjustment tank 32a, a coagulant addition tank 32b, a stirring tank 32c, and a sedimentation tank 32d, as shown in FIG. 7. Further, the pH adjustment tank 32a receives the $CO_2$ absorption liquids 3 and 5 and adjusts the $CO_2$ absorption liquids 3 and 5 to have pH suitable for the coagulation sedimentation of impurities, for example, using $CO_2$ recovered in the regenerator 6. In this case, surplus $CO_2$ is returned to the regenerator 6. Further, a coagulant of an inorganic coagulant such as ferric chloride or polyferric sulfate or an organic coagulant such as PAC is added in the coagulant addition tank 32b and stirred in the stirring tank 32c to coagulate the impurities, the impurities are sedimented in the sedimentation tank 32d, and a sediment is exhausted to the outside of the system. Further, supernatant treated water is supplied to the reclaimer 27.

Further, the treated water treated by the coagulation sedimentation treatment apparatus 32 through the first absorption liquid drawing path 7d and the second absorption liquid drawing path 7e is treated by the reclaimer 27, and accordingly, even when the coagulant remains, the coagulant is exhausted as concentrated residue 28 from the reclaimer 27. Further, the $CO_2$ absorption liquid 3 and the $CO_2$ absorption liquid 5 may be drawn through the first absorption liquid drawing path 7d and the second absorption liquid drawing path 7e and supplied to the reclaimer 27 to be separated into the condensate water 29 and the concentrated residue 28, instead of being treated by the coagulation sedimentation treatment apparatus 32.

Accordingly, in the $CO_2$ recovery system A and the $CO_2$ recovery method of the present embodiment, first, it is possible to separate the $CO_2$ absorption liquids 3 and 5 into the condensate water 29 and the concentrated residue 28 by drawing the $CO_2$ absorption liquids 3 and 5 through the absorption liquid drawing path 7d and the second absorption liquid drawing path 7e and treating the $CO_2$ absorption liquids 3 and 5 in the reclaimer 27, and to remove harmful impurities and impurities causing a thermostable salt by exhausting the concentrated residue 28 to the outside of the system.

Further, it is possible to reliably remove the impurities in the $CO_2$ absorption liquids 3 and 5 by treating the drawn $CO_2$ absorption liquids 3 and 5 in the coagulation sedimentation treatment apparatus 32 before the $CO_2$ absorption liquids 3 and 5 are treated in the reclaimer 27.

Thus, in the $CO_2$ recovery system A and the $CO_2$ recovery method of the present embodiment, it is possible to remove the impurities in the exhaust gas 1 by the reclaimer 27 and the coagulation sedimentation treatment apparatus 32 of the impurity removal unit 20 even when the removal of $CO_2$ from the exhaust gas 1 and recovery (regeneration) of $CO_2$ from the $CO_2$ absorption liquid 5 are performed while circulating the $CO_2$ absorption liquids 3 and 5 between the absorber 4 and the regenerator 6 through the absorption liquid circulation path 7.

Accordingly, the $CO_2$ recovery system A and the $CO_2$ recovery method of the present embodiment can prevent harmful impurities such as selenium from being dissolved in the $CO_2$ absorption liquids 3 and 5 and having a high concentration, unlike the related art. Further, it is possible to reduce the workload and cost required, for example, to treat waste generated accompanying the operation of the $CO_2$ recovery system A, exchange of the $CO_2$ absorption liquids 3 and 5, and maintenance of various apparatuses (each tower).

Further, since an impurity concentration in the reclaimer 27 is greatly lowered by including the coagulation sedimentation treatment apparatus 32, it is possible to increase a concentrating effect (concentrating magnification) of the reclaimer 27 and to improve efficiency of the reclaiming operation, i.e., increase throughput each time by the reclaimer 27.

Further, it is possible to perform the removal of the impurities efficiently and economically using $CO_2$ recovered in the regenerator 6 to adjust pH at the time of treatment in the coagulation sedimentation treatment apparatus 32.

Here, when the $CO_2$ recovery system A is configured by including the reclaimer 27, the $CO_2$ recovery system A (the impurity recovery unit 20) may not necessarily be configured as in the fifth embodiment and the sixth embodiment.

Figure 8:
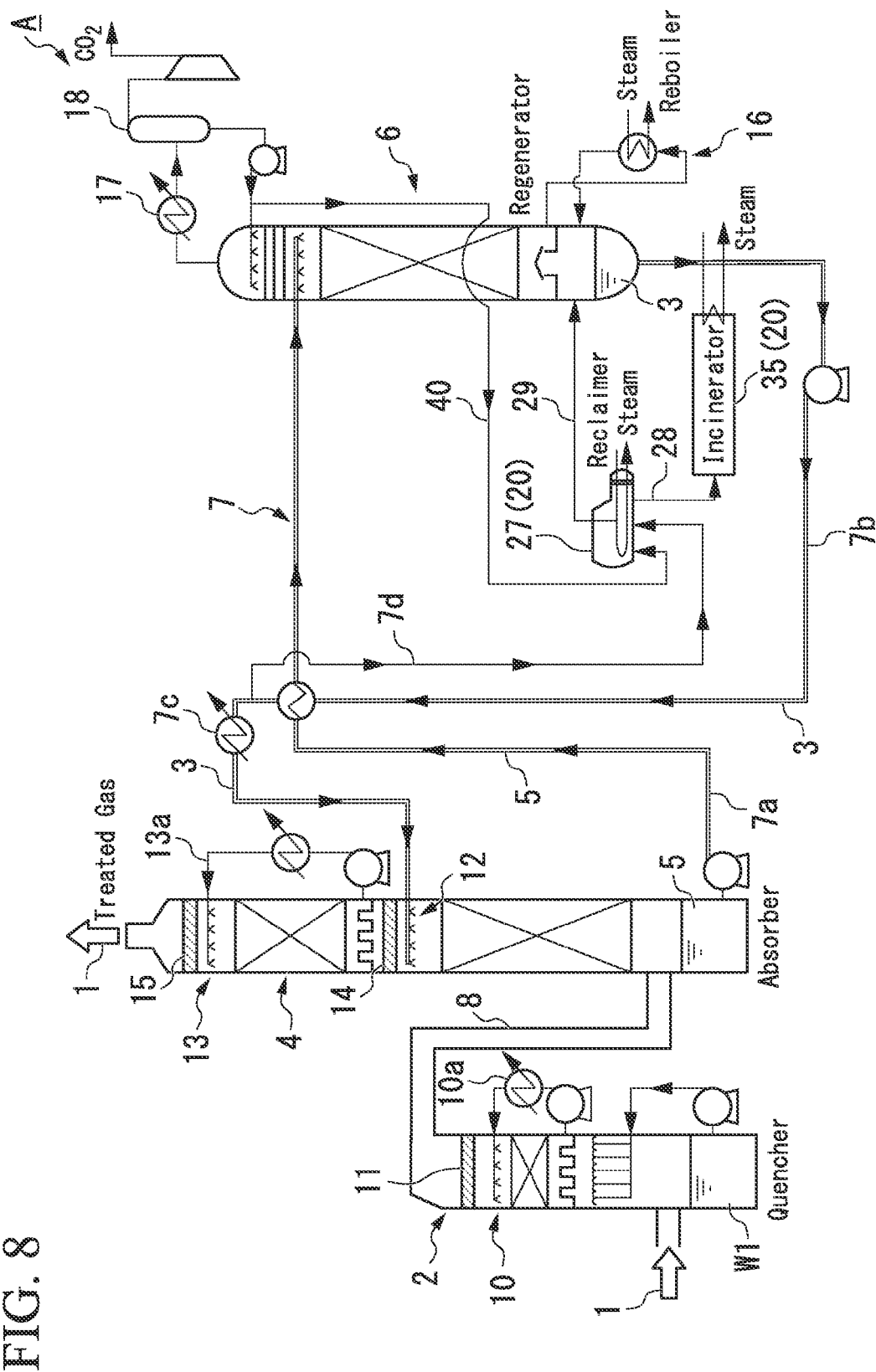
FIG. 8 is a diagram illustrating a modified example of the $CO_2$ recovery system (the $CO_2$ recovery method) according to the fifth and sixth embodiments of the present invention.

For example, as shown in FIG. 8, an incinerator (an incinerating apparatus) 35 that incinerates concentrated residue (reclaimed liquid; sludge) 28 generated in the reclaimer 27 may be included as the impurity recovery unit 20. In this case, when the concentrated residue 28 is incinerated in the incinerator 35, exhaust heat thereof may be recovered to generate steam and this steam may be reused, for example, as steam of the regenerator 6 and steam of the reclaimer 27. Accordingly, it is possible to obtain the same operational effect as that in the fifth embodiment and the sixth embodiment and to further improve energy efficiency.

Figure 9:
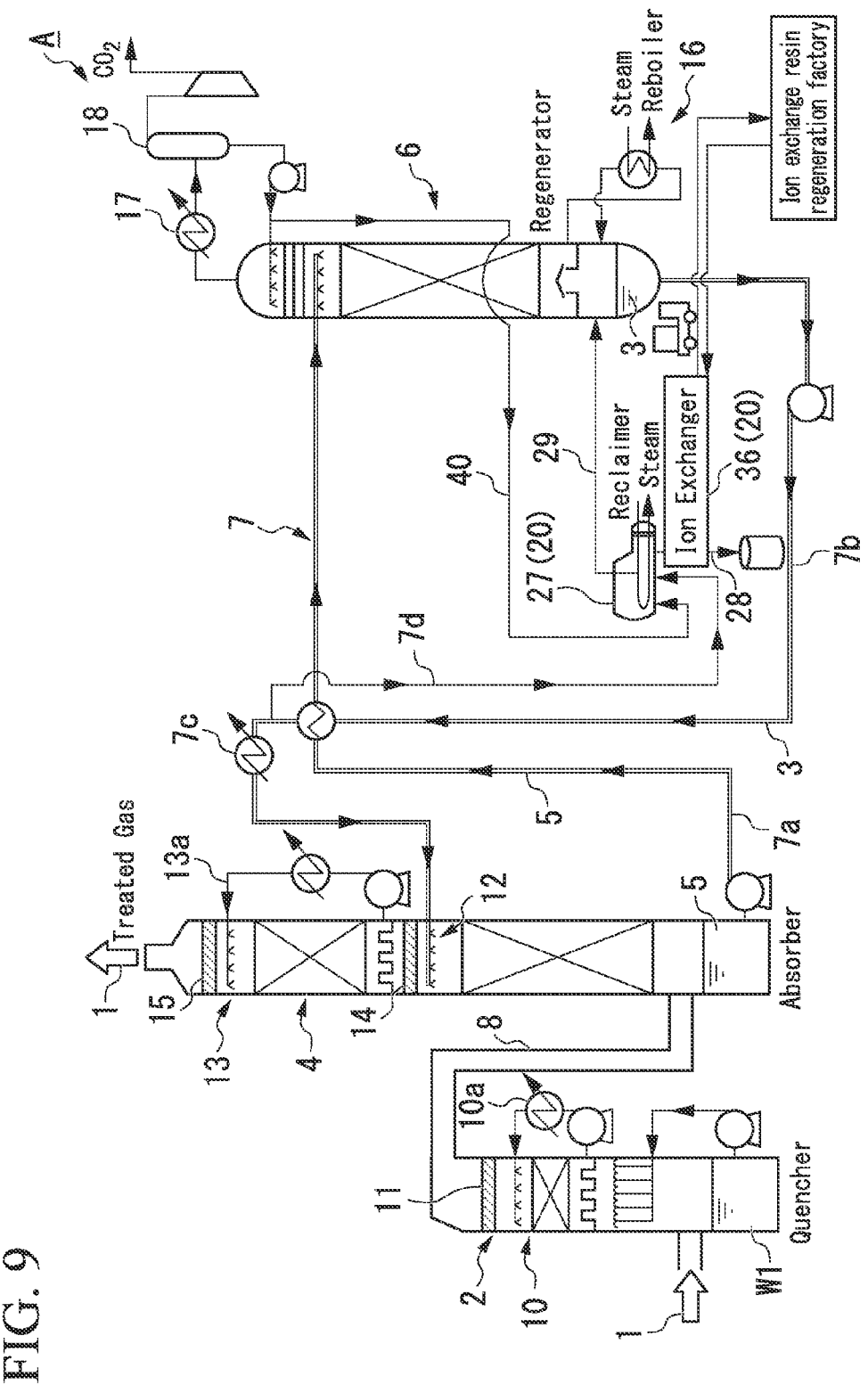
FIG. 9 is a diagram illustrating a modified example of the $CO_2$ recovery system (the $CO_2$ recovery method) according to the fifth and sixth embodiments of the present invention.

Further, as shown in FIG. 9, a third ion-exchange apparatus 36 that performs ion-exchanging and treats concentrated residue 28 generated in the reclaimer 27 may be included as the impurity recovery unit 20. The third ion-exchange apparatus 36 is configured similar to the first ion-exchange apparatus 30 and the second ion-exchange apparatus 31. Further, a harmful substance concentration of the concentrated residue 28 exhausted from the reclaimer 27, and thus the waste, can be reduced by the treatment in the third ion-exchange apparatus 36. Since the harmful substance concentration of the waste is lowered in this way, it becomes possible to make a treatment of the concentrated residue 28 as industrial waste unnecessary, and it is possible to achieve volume reduction of the waste and reduction of treatment cost of the waste. Further, it is possible to further reduce the waste by regenerating an ion-exchange resin of the third ion-exchange apparatus 36 at an ion-exchange resin regeneration factory.

Figure 10:
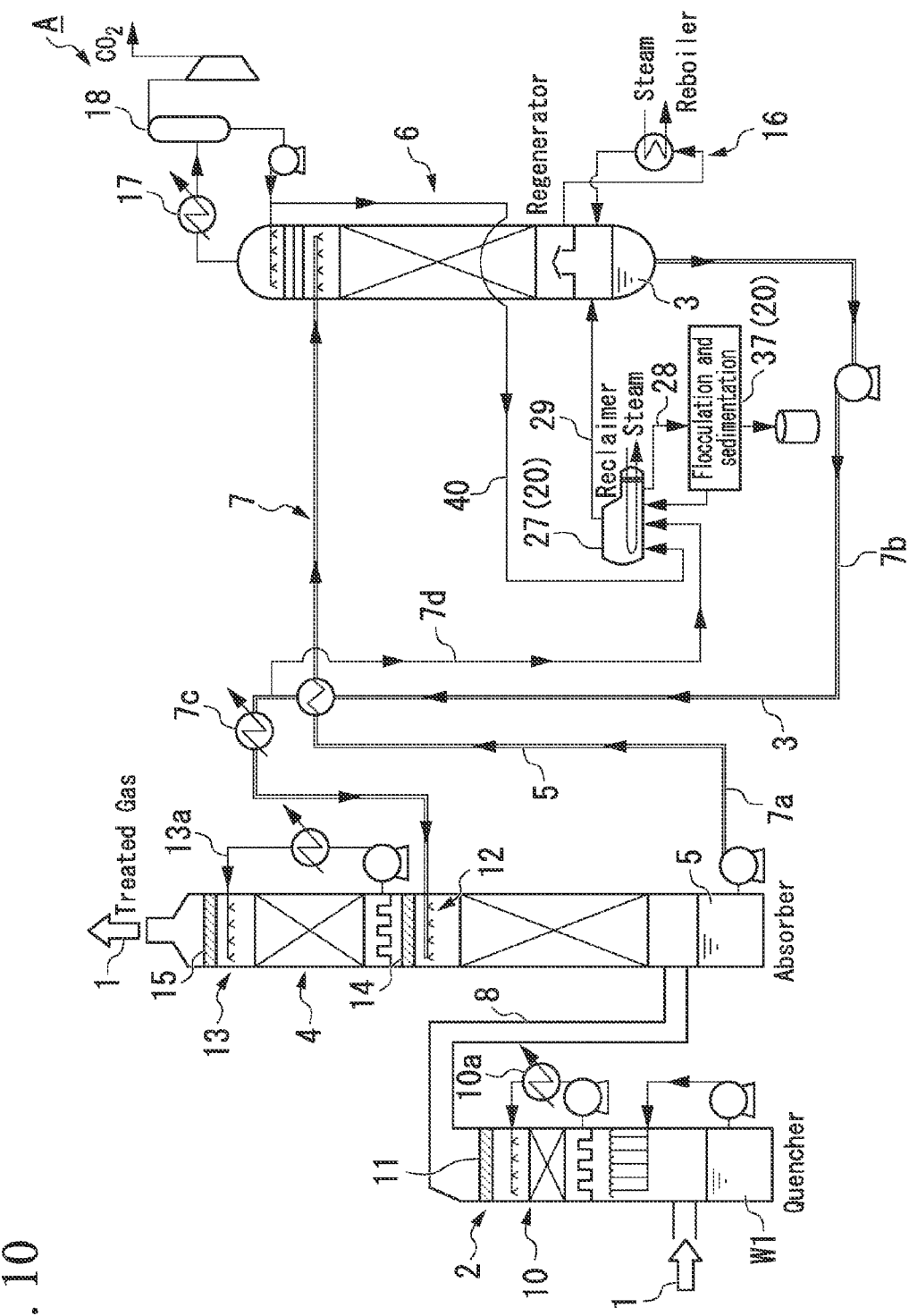
FIG. 10 is a diagram illustrating a modified example of the $CO_2$ recovery system (the $CO_2$ recovery method) according to the fifth and sixth embodiments of the present invention.

Further, a coagulation sedimentation treatment apparatus 37 that coagulates and sediments the concentrated residue 28 generated in the reclaimer 27 may be included as the impurity recovery unit 20, as shown in FIG. 10. The coagulation sedimentation treatment apparatus 37 may be configured similar to the coagulation sedimentation treatment apparatus 32. Further, it is possible to reduce a harmful substance concentration of the concentrated residue 28 exhausted from the reclaimer 27, and thus the waste, by treatment in the coagulation sedimentation treatment apparatus 37. By lowering the harmful substance concentration of the waste in this way, it becomes possible to make a treatment of the concentrated residue 28 as industrial waste unnecessary, and it is possible to achieve volume reduction of the waste, reduction of the treatment cost of the waste, and the like. Further, it is possible to reduce an exhaust water amount and to perform the recovery of amines contained in the $CO_2$ absorption liquid 3 by returning the treated water from the coagulation sedimentation treatment apparatus 37 to the reclaimer 27 and reclaiming the treated water again.

Figure 11:
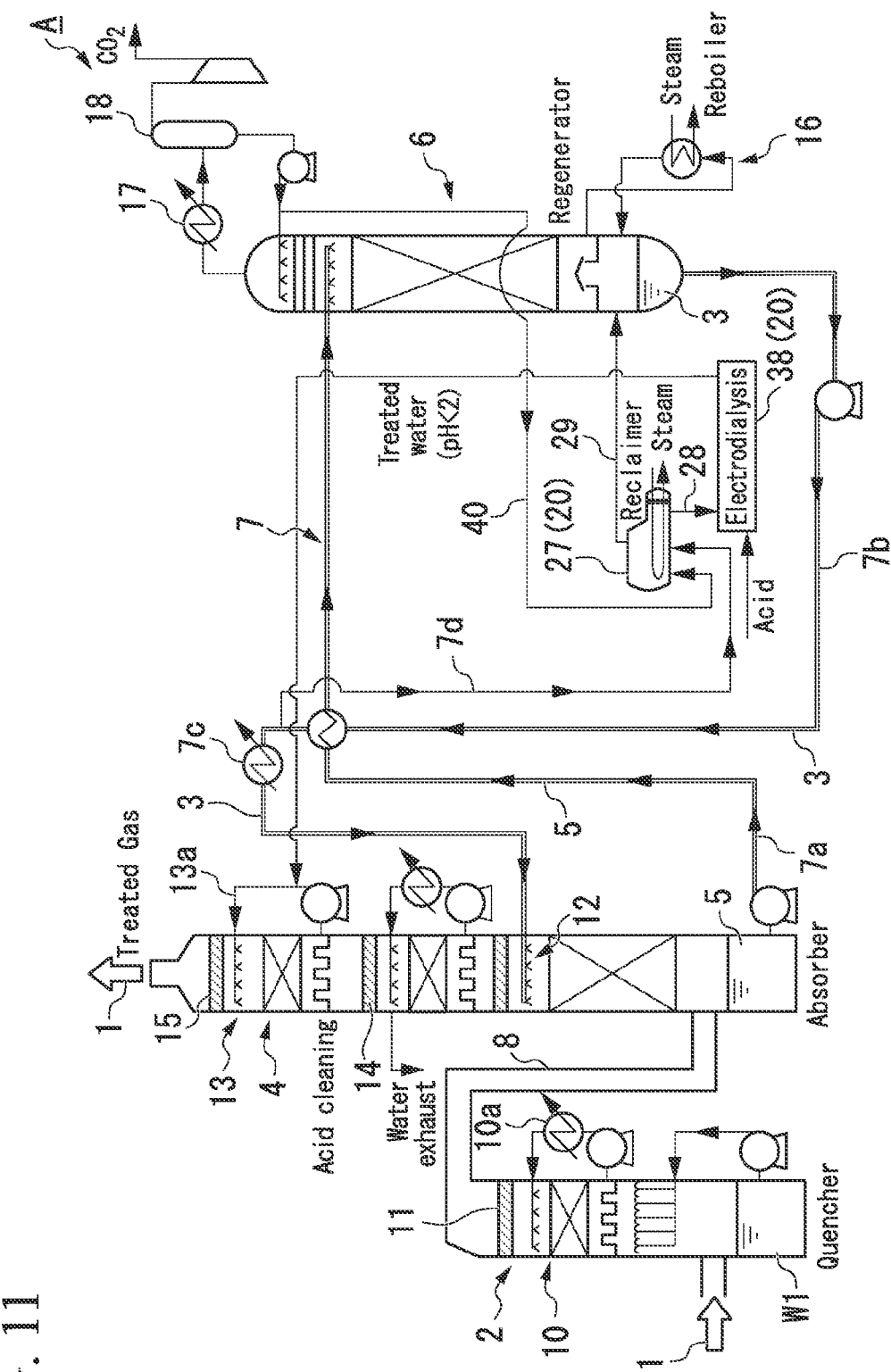
FIG. 11 is a diagram illustrating a modified example of the $CO_2$ recovery system (the $CO_2$ recovery method) according to the fifth and sixth embodiments of the present invention.

Further, an electrodialysis treatment apparatus 38 that performs electrodialysis on the concentrated residue 28 generated in the reclaimer 27 may be included as the impurity recovery unit 20, as shown in FIG. 11. When the concentrated residue 28 is treated in the electrodialysis treatment apparatus 38, an acid solution is added to the concentrated residue 28 in advance to ionize harmful impurities. Further, by performing the electrodialysis on the concentrated residue 28 in the electrodialysis treatment apparatus 38, it is possible to reduce a harmful substance concentration of the concentrated residue 28 exhausted from the reclaimer 27, and thus the waste. By lowering the harmful substance concentration of the waste in this way, it becomes possible to make a treatment of the concentrated residue 28 as industrial waste unnecessary, and it is possible to achieve volume reduction of the waste, reduction of the treatment cost of the waste, and the like. Further, since, for example, an acidic treatment liquid with pH equal to or less than 2 is generated when the concentrated residue 28 is treated by the electrodialysis treatment apparatus 38, this treatment liquid can be sent to the washing scrubber 13 of the absorber 4 and used as cleaning water for acid cleaning of the washing scrubber 13.

Figure 12:
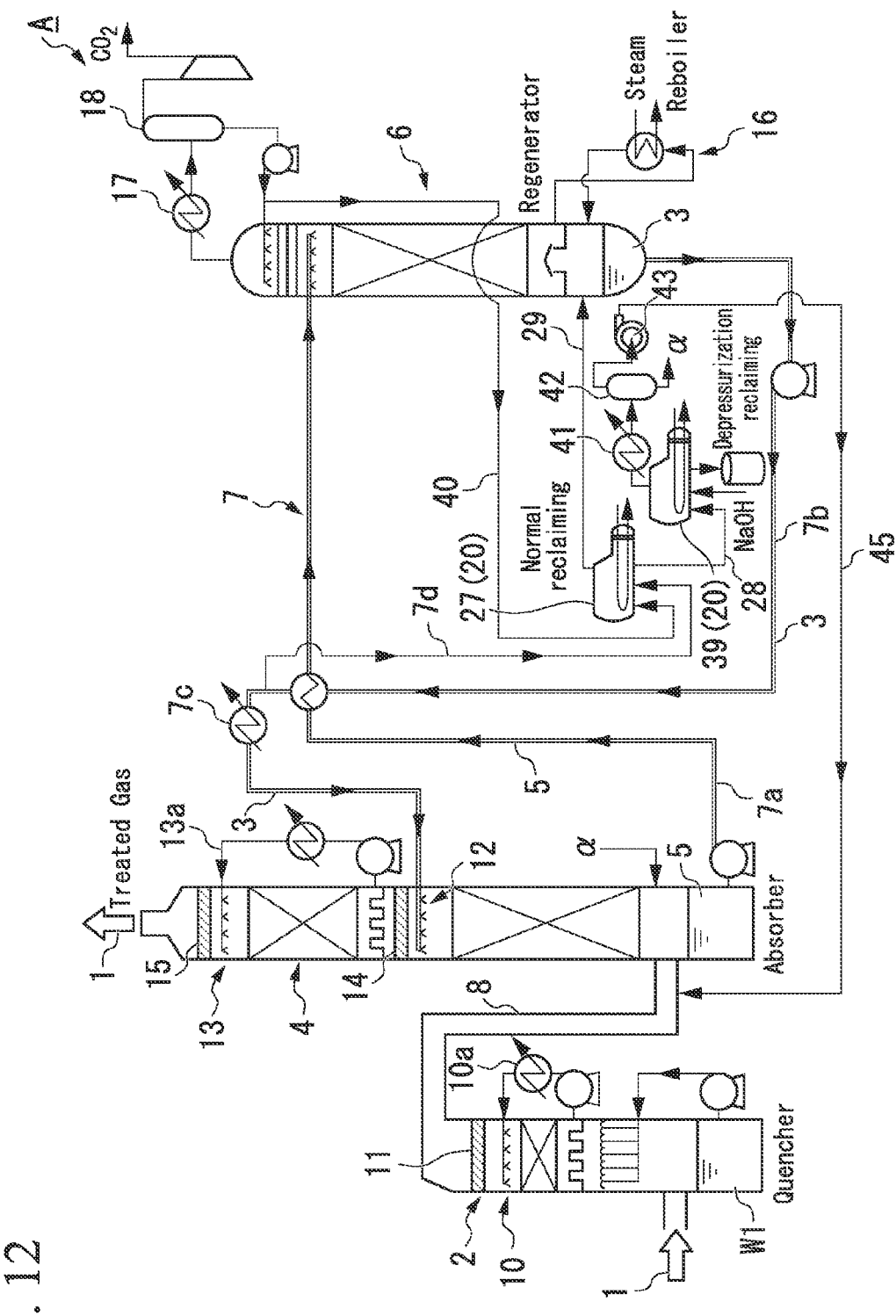
FIG. 12 is a diagram illustrating a modified example of the $CO_2$ recovery system (the $CO_2$ recovery method) according to the fifth and sixth embodiments of the present invention.

Further, the concentrated residue (reclaimed liquid; sludge) 28 after treatment in the normal first reclaimer 27 shown in FIGS. 5 to 11 may be treated in the second reclaimer 39 of the impurity removal unit 20, as shown in FIG. 12. In this case, NaOH is added to the concentrated residue 28 at the time of treatment in the second reclaimer 39 and a generation amount of $Na_2CO_3$ due to a reaction of $CO_2$ in the $CO_2$ absorption liquid 3 and a reflux liquid 40 to NaOH is reduced to improve an amine recovery effect due to NaOH. Further, since the generation amount of $Na_2CO_3$ is reduced, it is possible to minimize elevation of a boiling point and to increase a reclaiming throughput.

Further, it is possible to further increase an amine recovery amount by causing treatment in the second reclaimer 39 to be vacuum reclaiming. In other words, a vacuum reclaiming path 45 disposed by connecting a condenser 41, a gas and liquid separation apparatus 42, and a blower (a vacuum fan) 43 in series with the second reclaimer 39 is included. In this case, it is possible to further improve energy efficiency when heat recovery is performed using condensate water separated through heating in the second reclaimer 39. Further, it is possible to reduce power of a blower when a gas treated in the second reclaimer 39 and separated in the gas and liquid separation apparatus 42 is supplied to an entrance side of the absorber 2, e.g., a communication duct 8.

Figure 13:
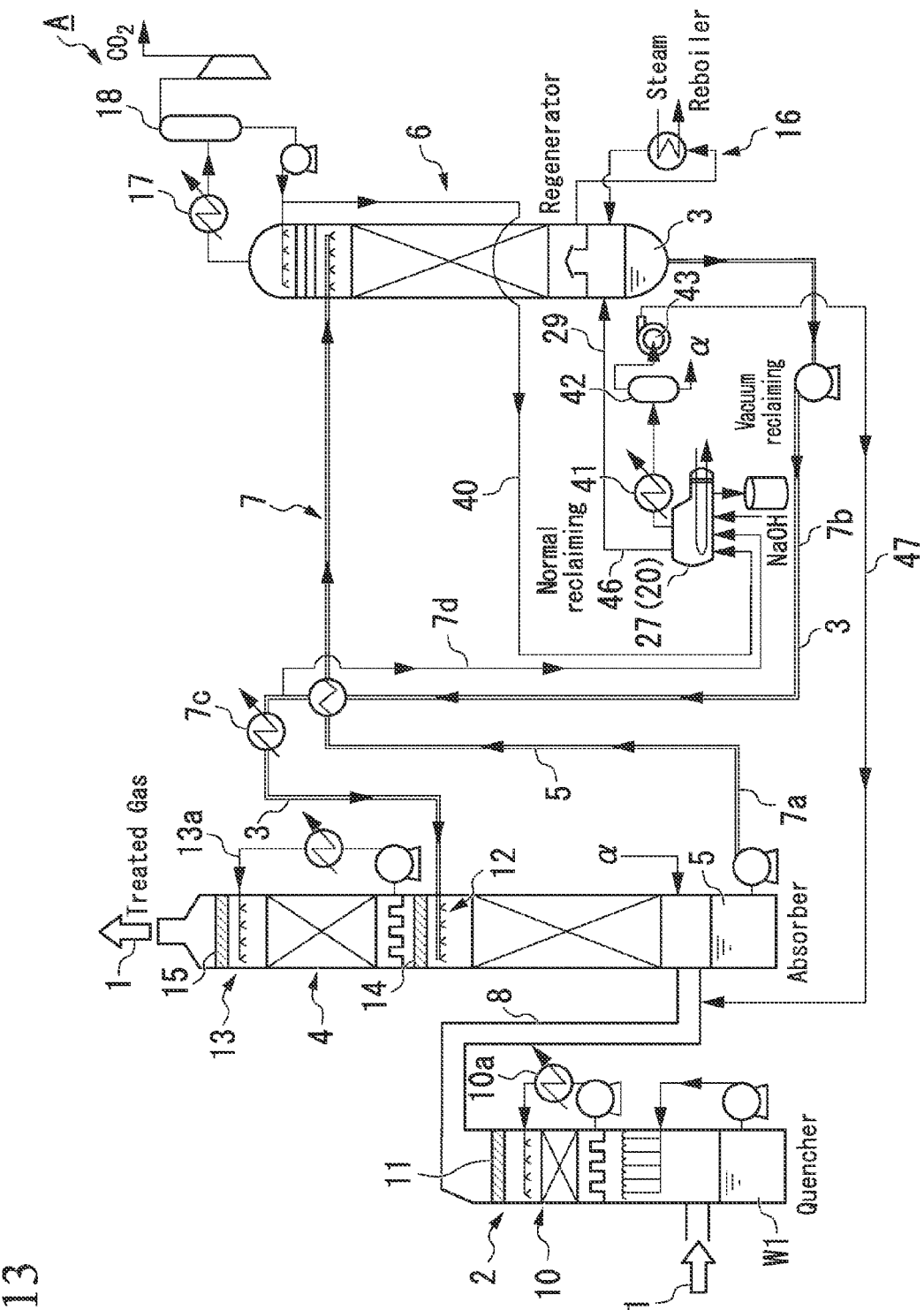
FIG. 13 is a diagram illustrating a modified example of the $CO_2$ recovery system (the $CO_2$ recovery method) according to the fifth and sixth embodiments of the present invention.

Further, as shown in FIG. 13, a return path 46 that returns condensate water 29 separated in one reclaimer 27 to the regenerator 6 may be provided and a vacuum reclaiming path 47 may be provided by connecting a condenser 41, a gas and liquid separation apparatus 42, and a blower (a vacuum fan) 43 in series with the reclaimer 27 so that one reclaimer 27 may be used in two operations of a first operation manipulation and a second operation manipulation.

Specifically, in the first operation manipulation of the reclaimer 27, a $CO_2$ absorption liquid (lean solvent) 3 is drawn from the regenerator 6, and the $CO_2$ absorption liquid 3 is heated, for example, at 130 to 150° C. to separate concentrated residue 28 and condensate water 29 from the $CO_2$ absorption liquid 3. The concentrated residue 28 is exhausted from a waste discharge line to the outside using a pump and treated, and the separated condensate water 29 is returned to the regenerator 6.

Next, in the second operation manipulation of the reclaimer 27, a generation amount of $Na_2CO_3$ generated by adding NaOH at the time of treatment in the reclaimer 27 and causing $CO_2$ in the $CO_2$ absorption liquid (lean solvent) 3 and a reflux liquid 40 to react to NaOH is reduced to improve an amine recovery effect by NaOH. Further, by reducing the generation amount of $Na_2CO_3$, it is possible to minimize elevation of a boiling point and increase a reclaiming throughput. Further, it is possible to further increase an amine recovery amount by causing the treatment in the reclaimer 27 to be vacuum reclaiming. In other words, it is possible to further improve the energy efficiency by performing heat recovery using the condensate water 29 separated by heating the $CO_2$ absorption liquid 3 in the reclaimer 27 as a cooling medium of the condenser. Further, it is possible to reduce power of the blower by supplying the gas treated in the reclaimer 27 and separated in the gas and liquid separation apparatus 42 to an entrance side of the absorber 2.

Figure 14:
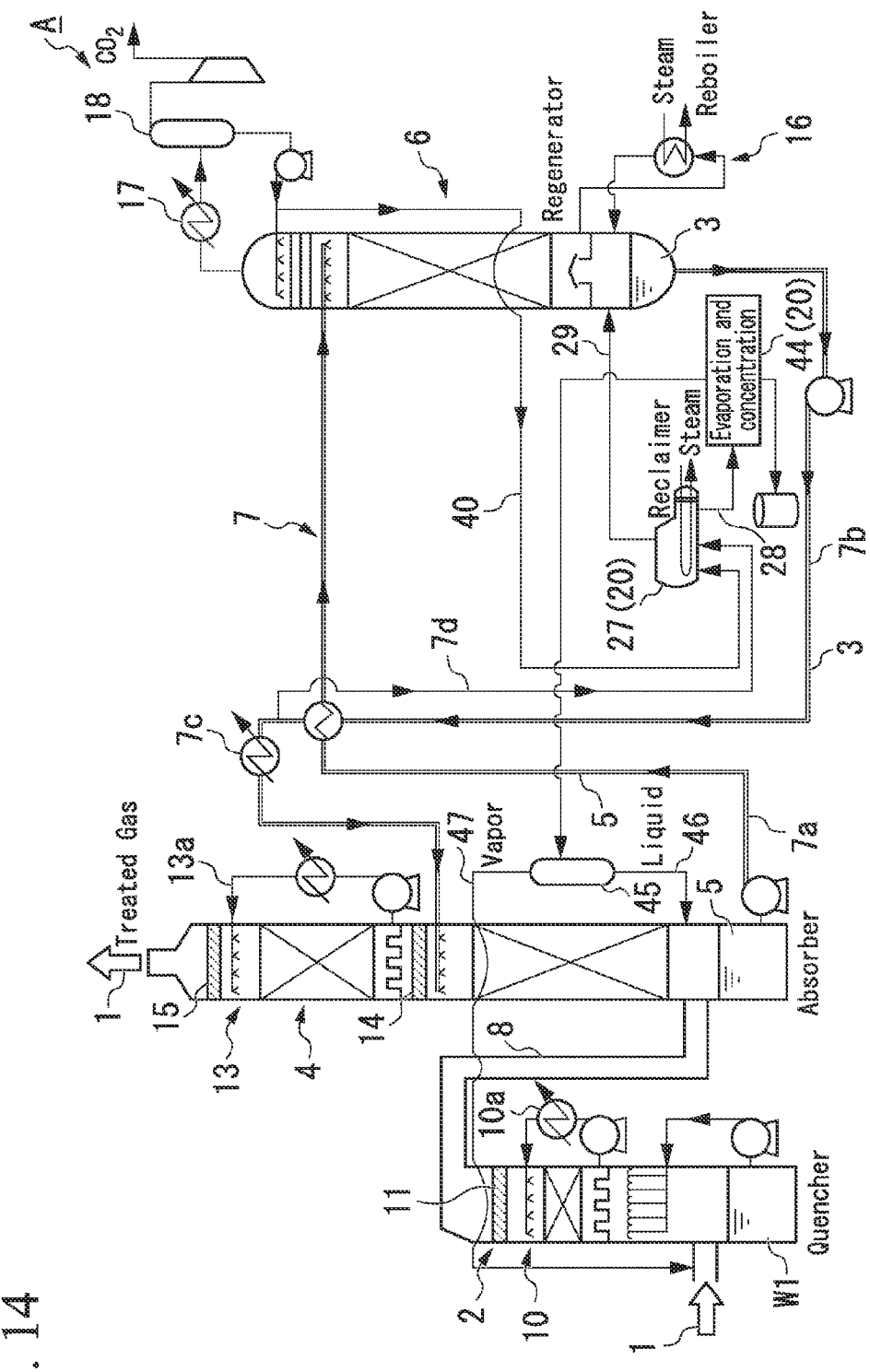
FIG. 14 is a diagram illustrating a modified example of the $CO_2$ recovery system (the $CO_2$ recovery method) according to the fifth and sixth embodiments of the present invention.
Figure 15:
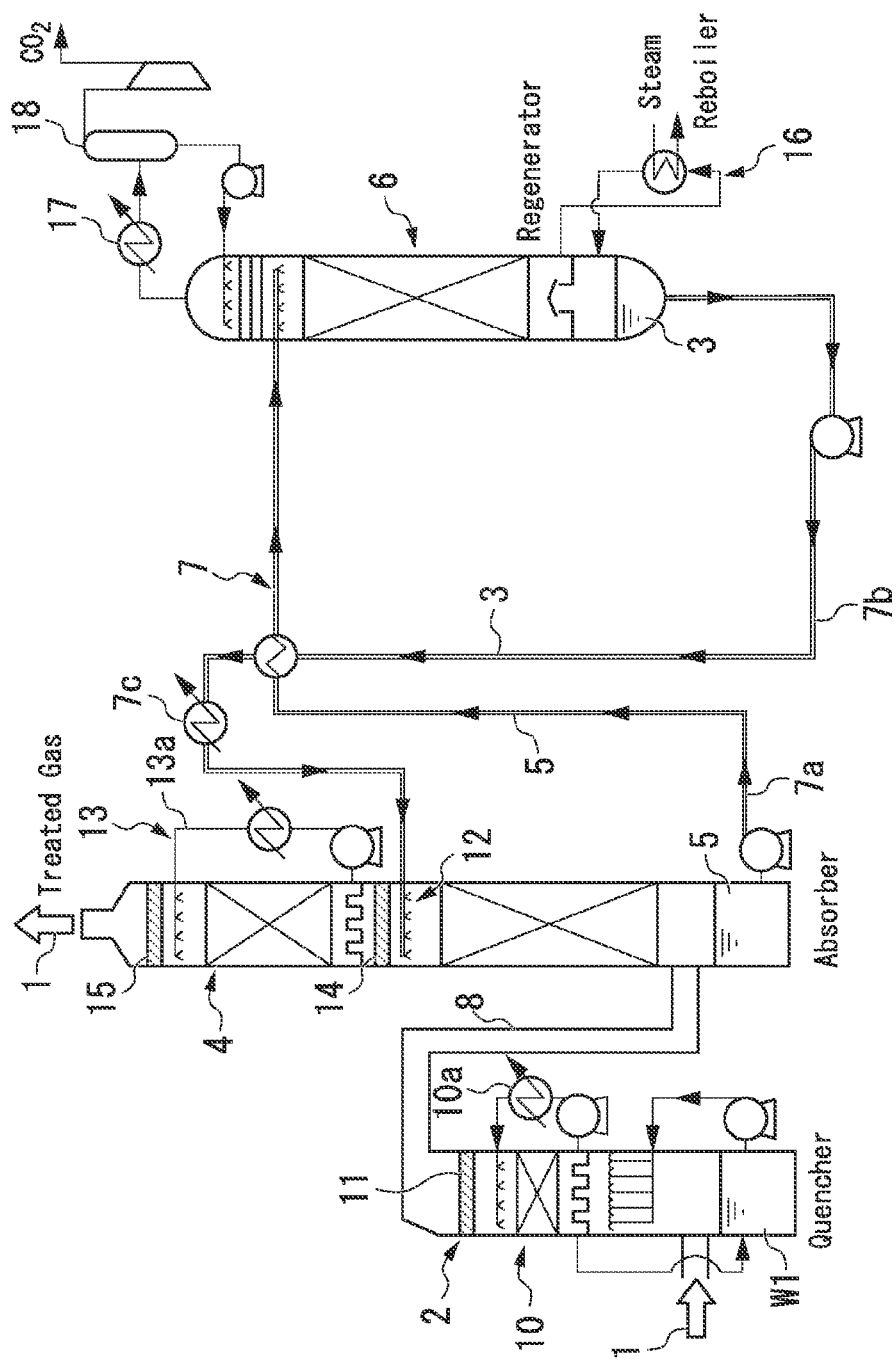
FIG. 15 is a diagram illustrating a $CO_2$ recovery system (a $CO_2$ recovery method) of the related art.

Further, harmful impurities may be recovered and removed from the $CO_2$ absorption liquid 3 by treating the concentrated residue (reclaimed liquid; sludge) 28 after treatment in the reclaimer 27, in the evaporation and concentration apparatus 44 of the impurity removal unit 20, as shown in FIG. 14. In this case, steam evaporated in the evaporation and concentration apparatus 44 is separated in the gas and liquid separation apparatus 45, condensate water 46 is returned to the absorber 4, and a gas 47 is returned to an entrance side of the quencher 2. Accordingly, it is possible to remove the harmful impurities, which have been vaporized in the evaporation and concentration apparatus 44, in the quencher 2 again. Further, it is possible to reduce the harmful substance concentration of the waste exhausted from the reclaimer 27 and it becomes possible to make a treatment of waste as industrial waste unnecessary. Thus, it is possible to achieve volume reduction of the waste and reduction of waste treatment cost.

While the first to sixth embodiments of the $CO_2$ recovery system and the $CO_2$ recovery method and embodiments as the modified examples thereof according to the present invention have been described above, the present invention is not limited to the embodiments described above and may be appropriately modified without departing from the scope and spirit of the present invention.

INDUSTRIAL APPLICABILITY

According to the $CO_2$ recovery system and the $CO_2$ recovery method described above, it is possible to prevent the harmful substances (impurities) such as selenium from being dissolved in the $CO_2$ absorption liquid and having a high concentration, unlike the related art.

Further, it is possible to reduce the workload and cost required, for example, to treat waste generated accompanying the operation of the $CO_2$ recovery system, exchange of the $CO_2$ absorption liquid, and maintenance of various apparatuses.

REFERENCE SIGNS LIST 1 exhaust gas
2 quencher (pre-treatment apparatus)
3 $CO_2$ absorption liquid (lean solvent)

4 absorber (absorption apparatus)
5 $CO_2$ absorption liquid (rich solvent)
6 regenerator (regeneration apparatus)
7 absorption liquid circulation path
7a absorption liquid transportation pipe
7b absorption liquid supply line
7c condenser
7d first absorption liquid drawing path
7e second absorption liquid drawing path
8 communication duct
10 washing scrubber (scrubber)
10a condenser
11 demister
12 absorption liquid scrubber
13 washing scrubber (scrubber)
13a washing water circulation path
14 demister
15 demister
16 reboiler
17 condenser
18 $CO_2$ compressor
20 impurity removal unit
21 electrostatic precipitator
22 exhaust water treatment apparatus
23 impurity removal demister
24 filtering apparatus
25 impurity removal demister
26 filtering apparatus
27 reclaimer (first reclaimer)
28 concentrated residue
29 condensate water
30 ion-exchange apparatus (first ion-exchange apparatus)
31 ion-exchange apparatus (second ion-exchange apparatus)
32 coagulation sedimentation treatment apparatus
32a pH adjustment tank
32b coagulant addition tank
32c stirring tank
32d sedimentation tank
35 incinerator
36 ion-exchange apparatus (third ion-exchange apparatus)
37 coagulation sedimentation treatment apparatus
38 electrodialysis treatment apparatus
39 reclaimer (second reclaimer)
40 reflux liquid
41 condenser
42 gas and liquid separation apparatus
43 blower (vacuum fan)
44 evaporation and concentration apparatus
45 vacuum reclaiming path
46 return path
47 vacuum reclaiming path
A $CO_2$ recovery system
W1 washing water

The invention claimed is:

1. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a reclaimer that draws and heats the $CO_2$ absorption liquid of the absorption liquid circulation path, heats and concentrates impurities in the $CO_2$ absorption liquid, and returns condensate water to the regeneration apparatus; and
an ion-exchange apparatus that brings the $CO_2$ absorption liquid of an absorption liquid drawing path that supplies the $CO_2$ absorption liquid from the absorption liquid circulation path to the reclaimer into contact with an ion-exchange resin to remove the impurities.

2. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a reclaimer that draws and heats the $CO_2$ absorption liquid of the absorption liquid circulation path, heats and concentrates impurities in the $CO_2$ absorption liquid, and returns condensate water to the regeneration apparatus; and
a coagulation sedimentation treatment apparatus that coagulates and sediments the $CO_2$ absorption liquid of an absorption liquid drawing path that supplies the $CO_2$ absorption liquid from the absorption liquid circulation path to the reclaimer, to remove the impurities.

3. The $CO_2$ recovery system according to claim 2, wherein:
the coagulation sedimentation treatment apparatus is configured to adjust the pH of the $CO_2$ absorption liquid using $CO_2$ separated in the regeneration apparatus.

4. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a reclaimer that draws and heats the $CO_2$ absorption liquid of the absorption liquid circulation path, heats and concentrates impurities in the $CO_2$ absorption liquid, and returns condensate water to the regeneration apparatus; and
an ion-exchange apparatus that brings concentrated residue generated from the reclaimer into contact with an ion-exchange resin to remove the impurities.

5. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a reclaimer that draws and heats the $CO_2$ absorption liquid of the absorption liquid circulation path, heats and concentrates impurities in the $CO_2$ absorption liquid, and returns condensate water to the regeneration apparatus; and
a coagulation sedimentation treatment apparatus that coagulates and sediments concentrated residue generated from the reclaimer to remove the impurities.

6. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a reclaimer that draws and heats the $CO_2$ absorption liquid of the absorption liquid circulation path, heats and concentrates impurities in the $CO_2$ absorption liquid, and returns condensate water to the regeneration apparatus; and
an electrodialysis treatment apparatus that performs electrodialysis on concentrated residue generated from the reclaimer to remove the impurities.

7. The $CO_2$ recovery system according to claim 6, wherein:
the pre-treatment apparatus includes a scrubber, and
acidic treated water generated by treatment in the electrodialysis treatment apparatus of the impurity removal unit is supplied as cleaning water for acid cleaning of the scrubber of the pre-treatment apparatus.

8. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a first reclaimer that draws and heats the $CO_2$ absorption liquid of the absorption liquid circulation path, heats and concentrates impurities in the $CO_2$ absorption liquid, and returns condensate water to the regeneration apparatus;
a condensate water return path that returns condensate water separated in the first reclaimer to the regeneration apparatus; and
a vacuum reclaiming path disposed by connecting a condenser, a gas and liquid separation apparatus, and a vacuum fan in series with the first reclaimer.

9. A $CO_2$ recovery system comprising:
a pre-treatment apparatus that cools an exhaust gas;
an absorption apparatus that brings a $CO_2$ absorption liquid into contact with the exhaust gas treated by the pre-treatment apparatus so that $CO_2$ in the exhaust gas is absorbed into the $CO_2$ absorption liquid;
a regeneration apparatus that receives the $CO_2$ absorption liquid having absorbed $CO_2$ from the absorption apparatus and heats the $CO_2$ absorption liquid to separate $CO_2$ from the $CO_2$ absorption liquid;
an absorption liquid circulation path that circulates the $CO_2$ absorption liquid between the absorption apparatus and the regeneration apparatus; and
an impurity removal unit, provided in the absorption liquid circulation path, that removes impurities dissolved in the $CO_2$ absorption liquid and having a high concentration in the absorption liquid circulation path from the exhaust gas, the impurity removal unit including:
a first reclaimer that draws and heats the $CO_2$ absorption liquid of the absorption liquid circulation path, heats and concentrates impurities in the $CO_2$ absorption liquid, and returns condensate water to the regeneration apparatus;
an evaporation and concentration apparatus that heats concentrated residue generated from the first reclaimer to generate steam, and heats and concentrates the concentrated residue; and
a gas and liquid separation apparatus that separates the steam generated from the evaporation and concentration apparatus into a gas and condensate water, and returns the gas to the pre-treatment apparatus and the condensate water to the absorption apparatus.

* * * * *